(12) United States Patent
Sudou

(10) Patent No.: US 11,269,337 B2
(45) Date of Patent: Mar. 8, 2022

(54) MANAGEMENT SYSTEM OF WORK SITE AND MANAGEMENT METHOD OF WORK SITE

(71) Applicant: Komatsu Ltd., Tokyo (JP)

(72) Inventor: Tsugio Sudou, Tokyo (JP)

(73) Assignee: Komatsu Ltd., Tokyo (JP)

( * ) Notice: Subject to any disclaimer, the term of this patent is extended or adjusted under 35 U.S.C. 154(b) by 202 days.

(21) Appl. No.: 16/613,488

(22) PCT Filed: Nov. 19, 2018

(86) PCT No.: PCT/JP2018/042706
§ 371 (c)(1),
(2) Date: Nov. 14, 2019

(87) PCT Pub. No.: WO2019/130911
PCT Pub. Date: Jul. 4, 2019

(65) Prior Publication Data
US 2021/0157324 A1    May 27, 2021

(30) Foreign Application Priority Data
Dec. 27, 2017  (JP) .............................. JP2017-252644

(51) Int. Cl.
| G01C 22/00 | (2006.01) |
| G05D 1/00 | (2006.01) |
| G05D 1/02 | (2020.01) |
| G06Q 10/04 | (2012.01) |
| G06Q 10/06 | (2012.01) |
| G06Q 50/02 | (2012.01) |
| G07C 5/00 | (2006.01) |

(52) U.S. Cl.
CPC ......... *G05D 1/0214* (2013.01); *G05D 1/0088* (2013.01); *G06Q 10/047* (2013.01); *G06Q 10/06315* (2013.01); *G05D 2201/0202* (2013.01); *G06Q 50/02* (2013.01); *G07C 5/008* (2013.01)

(58) Field of Classification Search
CPC ............... G05D 1/0214; G05D 1/0088; G05D 2201/0202; G06Q 10/047; G06Q 10/06315; G06Q 50/02; G07C 5/008
USPC .......................................................... 701/26
See application file for complete search history.

(56) References Cited

U.S. PATENT DOCUMENTS

| 6,539,294 B1 | 3/2003 | Kageyama |
| 6,633,800 B1 | 10/2003 | Ward et al. |

(Continued)

FOREIGN PATENT DOCUMENTS

| CN | 104122865 B | 4/2017 |
| JP | 60-176112 A | 9/1985 |

(Continued)

OTHER PUBLICATIONS

International Search Report dated Feb. 19, 2019, issued for PCT/JP2018/042706.

(Continued)

*Primary Examiner* — Mahmoud S Ismail
(74) *Attorney, Agent, or Firm* — Locke Lord LLP

(57) ABSTRACT

A management system of a work site includes a guidance unit which outputs, to a manned vehicle of a work site, guidance data for guiding the manned vehicle to an unmanned vehicle stopped due to occurrence of an abnormality at the work site.

6 Claims, 13 Drawing Sheets

(56) References Cited

U.S. PATENT DOCUMENTS

| | | | |
|---|---|---|---|
| 10,198,010 B2 | 2/2019 | Hiramatsu et al. | |
| 2005/0027410 A1 | 2/2005 | Kanner et al. | |
| 2005/0131627 A1* | 6/2005 | Ignatin | G08G 1/0104 |
| | | | 701/117 |
| 2008/0071470 A1 | 3/2008 | Hasegawa et al. | |
| 2010/0063673 A1* | 3/2010 | Anderson | G05D 1/00 |
| | | | 701/29.2 |
| 2010/0094499 A1* | 4/2010 | Anderson | G05D 1/0295 |
| | | | 701/23 |
| 2012/0095651 A1* | 4/2012 | Anderson | G05D 1/028 |
| | | | 701/50 |
| 2012/0316704 A1 | 12/2012 | Ohbayashi et al. | |
| 2017/0145663 A1 | 5/2017 | Hiranaka | |
| 2018/0181143 A1 | 6/2018 | Hiramatsu | |
| 2018/0182248 A1* | 6/2018 | Kanai | G08G 1/096855 |
| 2018/0326991 A1* | 11/2018 | Wendt | B60W 50/04 |

FOREIGN PATENT DOCUMENTS

| | | |
|---|---|---|
| JP | 11-296229 A | 10/1999 |
| JP | 2008-184979 A | 8/2008 |
| WO | 2015/147108 A1 | 10/2015 |
| WO | 2016/056677 A1 | 4/2016 |

OTHER PUBLICATIONS

Office Action dated Aug. 28, 2020, issued for the corresponding Australian Patent Application No. 2018394582.

Office Action dated Jun. 11, 2021, issued in the corresponding Australian patent application No. 2018394582.

Office Action dated Feb. 8, 2021, issued for the corresponding Australian patent application No. 2018394582.

* cited by examiner

MANAGEMENT SYSTEM OF WORK SITE AND MANAGEMENT METHOD OF WORK SITE

FIELD

The present invention relates to a management system of a work site and a management method of a work site.

BACKGROUND

An unmanned vehicle may be used in a large area work site such as a mine or a quarry. In addition, there is also a case where a manned vehicle that manages the work site travels the work site (see Patent Literature 1).

CITATION LIST

Patent Literature

Patent Literature 1: Japanese Patent Application Laid-Open No. 2008-184979

SUMMARY

Technical Problem

In a case where the unmanned vehicle is stopped due to occurrence of an abnormality in the unmanned vehicle during traveling, if the unmanned vehicle is left stopped, productivity of the work site is reduced. When the unmanned vehicle is stopped due to the occurrence of the abnormality in the unmanned vehicle, it is necessary to promptly ascertain the situation of the unmanned vehicle and take measures in order to suppress the decrease in productivity of the work site.

An aspect of the invention aims to suppress a decrease in productivity at a work site where an unmanned vehicle operates.

Solution to Problem

According to an aspect of the present invention, a management system of a work site comprises: a guidance unit which outputs, to a manned vehicle of a work site, guidance data for guiding the manned vehicle to an unmanned vehicle stopped due to occurrence of an abnormality at the work site.

Advantageous Effects of Invention

According to the aspect of the invention, it is possible to suppress the decrease in productivity at the work site where the unmanned vehicle operates.

DESCRIPTION OF EMBODIMENTS

Hereinafter, embodiments of the invention will be described with reference to the drawings, but the invention is not limited thereto. The components of the embodiments described below can be combined as appropriate. In addition, some components may not be used.

[Management System]

Figure 1:
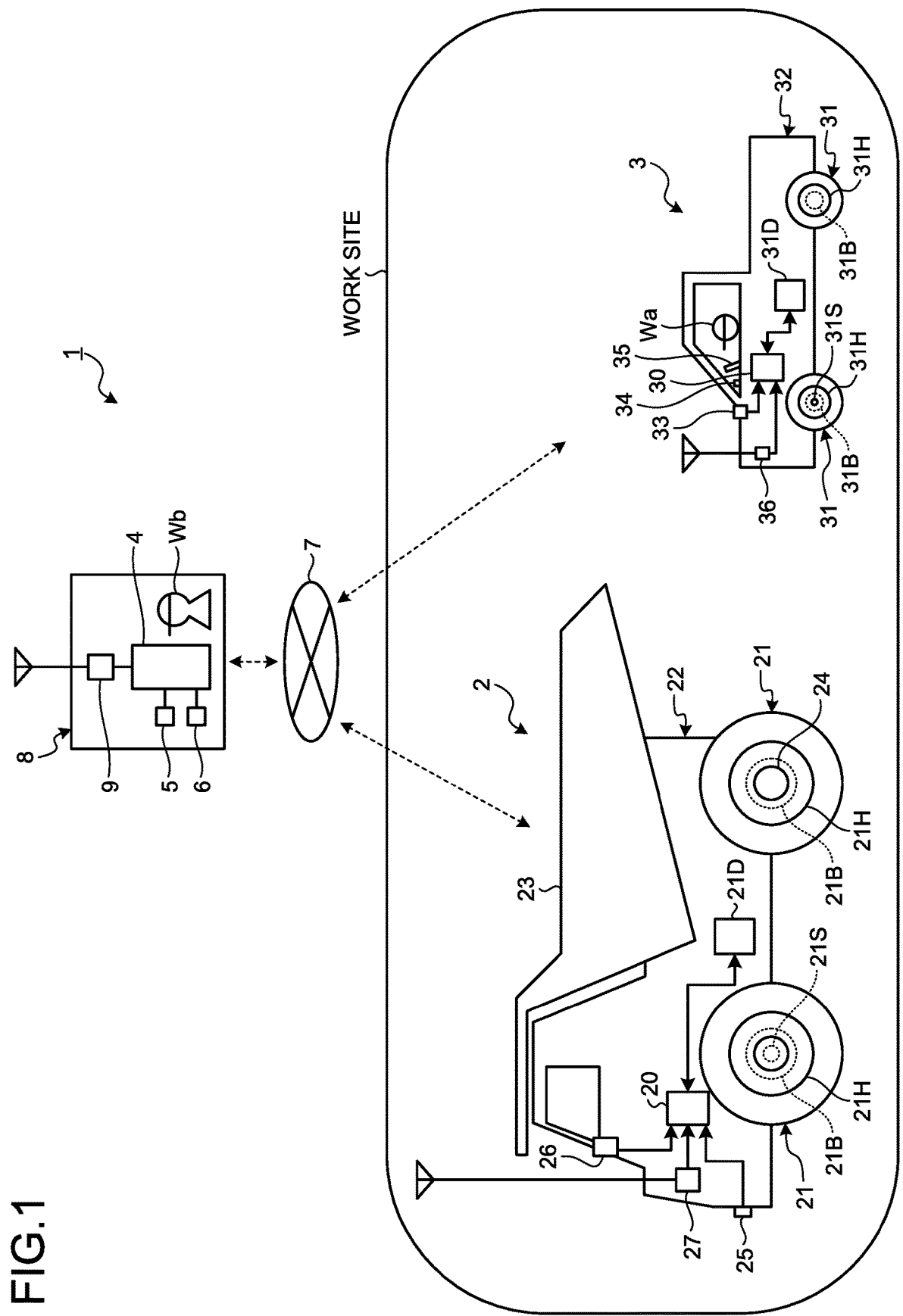
FIG. 1 is a view schematically illustrating an example of a management system of a work site according to this embodiment.

FIG. 1 is a view schematically illustrating an example of a management system 1 of a work site according to this embodiment. As illustrated in FIG. 1, at the work site, an unmanned vehicle 2 and a manned vehicle 3 operate.

The unmanned vehicle 2 refers to a vehicle that travels unmanned without depending on the driver's driving operation. The unmanned vehicle 2 travels on the basis of target travel data to be described later. Incidentally, the unmanned vehicle 2 may travel by remote control or may travel autonomously. The manned vehicle 3 refers to a vehicle that travels by the driving operation of a driver Wa who gets on the vehicle.

The work site is a mine or quarry. The unmanned vehicle 2 is a dump truck that travels the work site to transport cargo. The manned vehicle 3 is a management vehicle that manages the work site. The mine is a place or an office where minerals are mined. The quarry is a place or an office where rocks are mined. Examples of the cargo to be transported to the unmanned vehicle 2 include ore or sediment excavated in the mine or the quarry.

The management system 1 includes a management device 4, an input device 5, an output device 6, and a communication system 7. The management device 4, the input device 5, and the output device 6 are installed, for example, in a control facility 8 at the work site. The communication system 7 communicates between the management device 4, the unmanned vehicle 2, and the manned vehicle 3. A wireless communication device 9 is connected to the management device 4. The communication system 7 includes the wireless communication device 9. The management device 4, the unmanned vehicle 2 and the manned vehicle 3 communicate wirelessly via the communication system 7. The unmanned vehicle 2 travels on the work site on the basis of the target travel data from the management device 4.

The input device 5 is operated by an administrator Wb at the control facility 8. The input device 5 generates input data by being operated by the administrator Wb. The input data generated by the input device 5 is output to the management device 4. The input device 5 is exemplified by at least one of a computer keyboard, a button, a switch, and a touch panel.

The output device 6 is controlled by the management device 4 and outputs prescribed output data. The output device 6 is exemplified by at least one of a display device capable of displaying display data, an audio output device capable of outputting an audio, and a printing device capable of outputting a printed matter. In this embodiment, the output device 6 includes a display device. In the following description, the output device 6 is appropriately referred to as a display device 6.

The display device 6 includes a flat panel display such as a liquid crystal display (LCD) or an organic electroluminescence display (OELD). The administrator Wb can view the display screen of the display device 6.

[Unmanned Vehicle]

The unmanned vehicle 2 can travel at the work site. The unmanned vehicle 2 includes a control device 20, a traveling device 21, a vehicle body 22 supported by the traveling device 21, a dump body 23 supported by the vehicle body 22, a vehicle speed sensor 24 for detecting the traveling speed of the unmanned vehicle 2, a non-contact sensor 25 for detecting an object in a non-contact manner, a position sensor 26 for detecting the position of the unmanned vehicle 2, and a wireless communication device 27.

The traveling device 21 includes a drive device 21D, a brake device 21B, a steering device 21S, and a wheel 21H. The unmanned vehicle 2 travels by the rotation of the wheel 21H. The wheel 21H includes front wheels and rear wheels. A tire is mounted on the wheel 21H.

The drive device 21D generates a driving force for accelerating the unmanned vehicle 2. The drive device 21D includes at least one of an internal combustion engine such as a diesel engine and a motor. The driving force generated by the drive device 21D is transmitted to the wheel 21H (rear wheel). The brake device 21B generates a braking force for decelerating or stopping the unmanned vehicle 2. The steering device 21S generates a steering force for adjusting the traveling direction of the unmanned vehicle 2. The steering force generated by the steering device 21S is transmitted to the wheel 21H (front wheels).

The control device 20 outputs a driving command to the traveling device 21. The driving command includes at least one of an accelerator command to operate the drive device 21D to accelerate the unmanned vehicle 2, a brake command to operate the brake device 21B to decelerate or stop the unmanned vehicle 2, and a steering command for operating the steering device 21S to adjust the traveling direction of the unmanned vehicle 2. The drive device 21D generates a driving force for accelerating the unmanned vehicle 2 on the basis of the accelerator command output from the control device 20. The brake device 21B generates a braking force for decelerating or stopping the unmanned vehicle 2 on the basis of the brake command output from the control device 20. The steering device 21S generates a steering force for causing the unmanned vehicle 2 to go straight or swing on the basis of the steering command output from the control device 20.

The vehicle speed sensor 24 detects the traveling speed of the unmanned vehicle 2. The vehicle speed sensor 24 detects, for example, the rotational speed of the wheel 21H to detect the traveling speed of the unmanned vehicle 2.

The non-contact sensor 25 detects an object around the unmanned vehicle 2 in a non-contact manner. The object includes an obstacle that prevents the unmanned vehicle 2 from traveling. The non-contact sensor 25 is provided at the front portion of the vehicle body 22. Incidentally, the non-contact sensor 25 may be provided at the side portion of the vehicle body 22. The non-contact sensor 25 includes a laser scanner device. The non-contact sensor 25 detects an object in a non-contact manner using laser light which is detection light. The non-contact sensor 25 can detect the presence or absence of an object, the relative position to the object, and the relative velocity to the object. Incidentally, the non-contact sensor 25 may include a radar device such as a millimeter wave radar device. The radar device can detect an object in a non-contact manner using radio waves.

The position sensor 26 detects the position of the unmanned vehicle 2. The position sensor 26 detects the position of the unmanned vehicle 2 using a Global Navigation Satellite System (GNSS). The global navigation satellite system includes a Global Positioning System (GPS). The global navigation satellite system detects the absolute position of the unmanned vehicle 2 defined by coordinate data of latitude, longitude, and altitude. The global navigation satellite system detects the position of the unmanned vehicle 2 defined in the global coordinate system. The global coordinate system is a coordinate system fixed to the earth. The position sensor 26 includes a GPS receiver and detects the absolute position (coordinates) of the unmanned vehicle 2.

The wireless communication device 27 can wirelessly communicate with the management device 4. The communication system 7 includes the wireless communication device 27.

[Manned Vehicle]

The manned vehicle 3 can travel at the work site. The manned vehicle 3 includes a control device 30, a traveling device 31, a vehicle body 32 supported by the traveling device 31, a position sensor 33 for detecting the position of the manned vehicle 3, an input device 34, an output device 35, and a wireless communication device 36.

The traveling device 31 includes a drive device 31D, a brake device 31B, a steering device 31S that adjusts the traveling direction, and a wheel 31H. The manned vehicle 3 travels by rotation of the wheel 31H. The wheel 31H includes front wheels and rear wheels. A tire is mounted on the wheel 31H.

The drive device 31D generates a driving force for accelerating manned vehicle 3. The drive device 31D includes an internal combustion engine such as a diesel engine. The brake device 31B generates a braking force for decelerating or stopping the manned vehicle 3. The steering device 31S generates a steering force for adjusting the traveling direction of the manned vehicle 3.

The manned vehicle 3 has a driver's cab on which the driver Wa rides. An accelerator operation unit for operating the drive device 31D, a brake operation unit for operating the brake device 31B, and a steering operation unit for operating the steering device 31S are provided in the driver's cab. The accelerator operation unit includes an accelerator pedal. The brake operation unit includes a brake pedal. The steering operation unit includes a steering wheel. The accelerator operation unit, the brake operation unit, and the steering operation unit are operated by the driver Wa. The driver Wa operates one or both of the accelerator operation unit and the brake operation unit to adjust the traveling speed of the manned vehicle 3. The driver Wa operates the steering operation unit to adjust the traveling direction of the manned vehicle 3.

The position sensor 33 detects the position of the manned vehicle 3. The position sensor 33 includes a GPS receiver and detects the absolute position (coordinates) of the manned vehicle 3.

The input device 34 is arranged in the driver's cab. The input device 34 is operated by the driver Wa. The input device 34 generates input data by being operated by the driver Wa. The input data generated by the input device 34 is output to the control device 30. The input device 34 is exemplified by at least one of a computer keyboard, a button, a switch, a touch panel, and a portable terminal.

The output device 35 is arranged in the driver's cab. The output device 35 is controlled by the control device 30 and outputs prescribed output data. The output device 35 is exemplified by at least one of a display device capable of displaying display data, an audio output device capable of outputting an audio, and a printing device capable of outputting a printed matter. In this embodiment, the output device 35 includes a display device. In the following description, the output device 35 is appropriately referred to as a display device 35.

The display device 35 includes a flat panel display such as a liquid crystal display or an organic EL display. The driver Wa can view the display screen of the display device 35.

The wireless communication device 36 can wirelessly communicate with the management device 4 and the control device 20 of the unmanned vehicle 2. The communication system 7 includes the wireless communication device 36.

[Summary of Processing]

Figure 2:
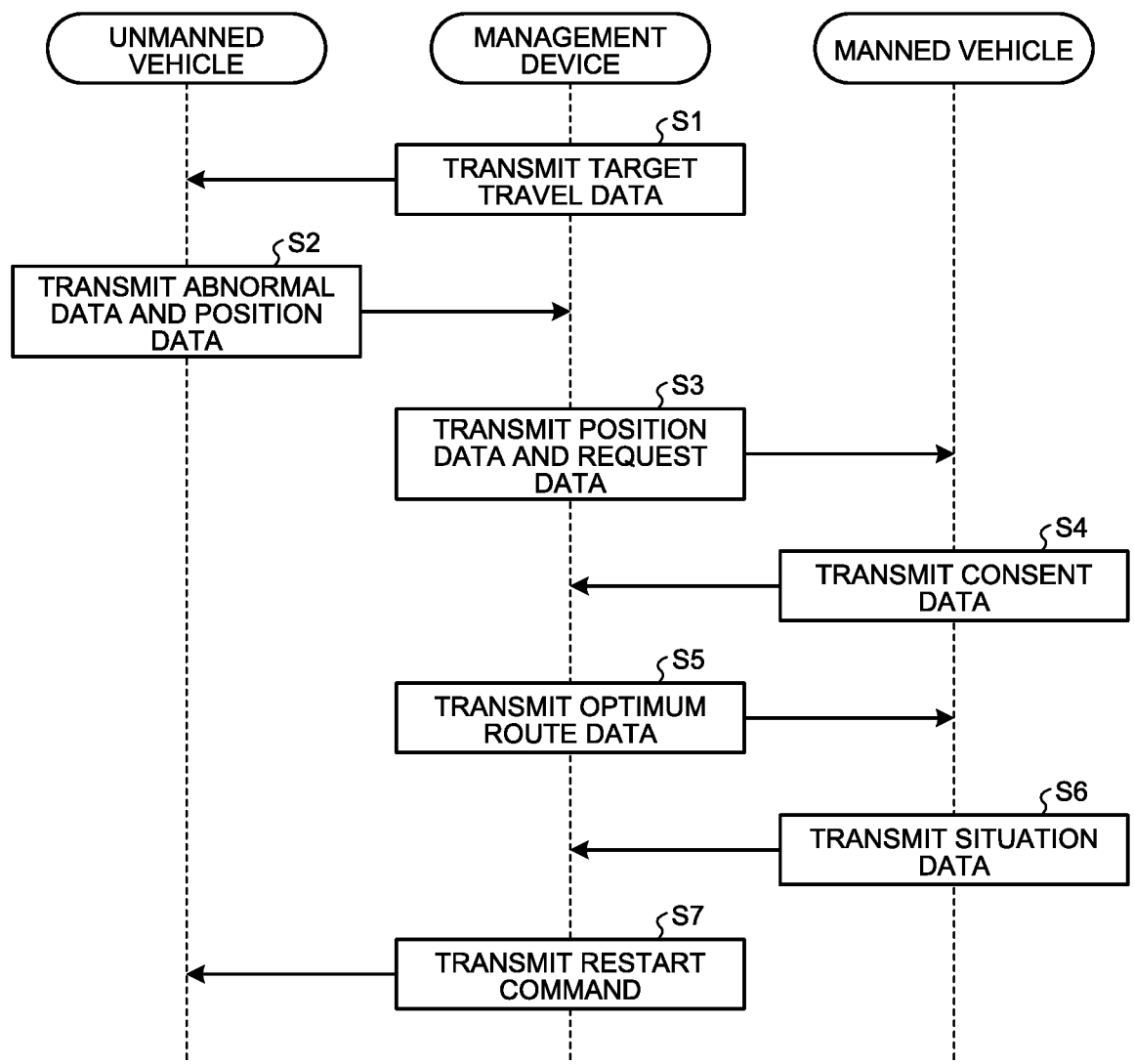
FIG. 2 is a sequence diagram illustrating processing of the management system according to this embodiment.

FIG. 2 is a sequence diagram illustrating an outline of processing of the management system 1 according to this embodiment. The management device 4 generates target travel data indicating a target travel condition of the unmanned vehicle 2. The management device 4 transmits the target travel data to the unmanned vehicle 2 via the communication system 7 (Step S1).

The target travel condition of the unmanned vehicle 2 refers to the target condition of the travel state required of the unmanned vehicle 2 by the management system 1. The target travel condition of the unmanned vehicle 2 includes a target travel speed, a target acceleration, and a target travel course of the unmanned vehicle 2. The target travel condition is defined, for example, in a global coordinate system.

The unmanned vehicle 2 receives target travel data. The unmanned vehicle 2 travels on the basis of the target travel data.

When an abnormality occurs in the unmanned vehicle 2 during traveling, the unmanned vehicle 2 stops. The unmanned vehicle 2 transmits abnormal data indicating the occurrence of the abnormality and the position data of the unmanned vehicle 2 stopped due to the occurrence of the abnormality to the management device 4 via the communication system 7 (Step S2).

The management device 4 receives the abnormal data from the unmanned vehicle 2. The management device 4 starts processing for guiding the manned vehicle 3 to the unmanned vehicle 2 stopped due to the occurrence of the abnormality. The management device 4 transmits the position data of the stopped unmanned vehicle 2 and the request data for requesting traveling to the unmanned vehicle 2 to the manned vehicle 3 via the communication system 7 (Step S3).

The manned vehicle 3 receives the position data of the stopped unmanned vehicle 2 and the request data. In a case where the driver Wa of the manned vehicle 3 consents to travel toward the unmanned vehicle 2, the driver operates the input device 34 to generate consent data for consenting to travel toward the unmanned vehicle 2. The manned vehicle 3 transmits the consent data to the management device 4 via the communication system 7 (Step S4).

The management device 4 receives the consent data. The management device 4 transmits optimum route data indicating an optimum route to the stopped unmanned vehicle 2 to the manned vehicle 3 having output the consent data via the communication system 7 (Step S5).

The manned vehicle 3 receives the optimum route data. The driver Wa of the manned vehicle 3 having received the optimum route data drives the manned vehicle 3 toward the unmanned vehicle 2 in which the abnormality occurs on the basis of the optimum route data. The optimum route data is displayed on the display device 35. The driver Wa can drive the manned vehicle 3 toward the unmanned vehicle 2 in which the abnormality occurs while viewing the optimum route data displayed on the display device 35. The driver Wa of the manned vehicle 3 that has arrived at the unmanned vehicle 2 ascertains the situation of the stopped unmanned vehicle 2. The situation of the unmanned vehicle 2 includes the situation around the unmanned vehicle 2. The driver Wa operates the input device 34 to transmit situation data indicating the situation of the unmanned vehicle 2. The situation data includes, for example, surrounding image data of the unmanned vehicle 2 captured by a camera. The camera may be a camera mounted on a portable terminal. The image data may be a still image or a moving image. Safety is ensured when the driver Wa of the manned vehicle 3 ascertains the surroundings of the unmanned vehicle 2. The manned vehicle 3 transmits the situation data indicating the situation of the unmanned vehicle 2 to the management device 4 via the communication system 7 (Step S6).

The management device 4 receives the situation data. On the basis of the situation data, the management device 4 determines whether or not the unmanned vehicle 2 can travel on the basis of the target travel data. Incidentally, the administrator Wb may determine whether or not the unmanned vehicle 2 can travel on the basis of the target travel data. If it is determined that the unmanned vehicle 2 can resume normal traveling, the management device 4 transmits a restart command for traveling on the basis of the target traveling data to the stopped unmanned vehicle 2 via the communication system 7 (Step S7). Accordingly, the unmanned vehicle 2 travels on the basis of the target travel data.

[Control Device]

Figure 3:
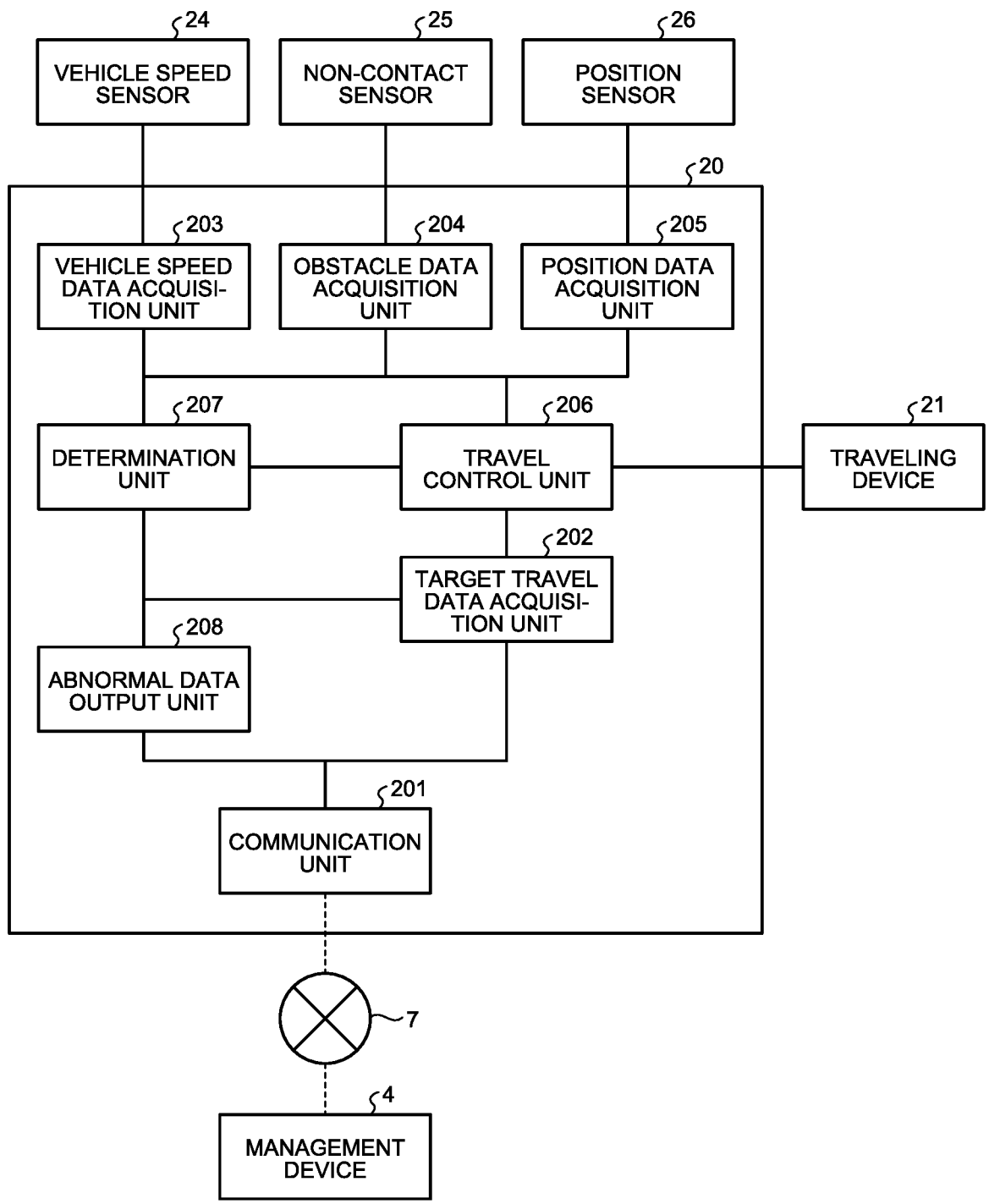
FIG. 3 is a functional block diagram illustrating a control device according to this embodiment.

FIG. 3 is a functional block diagram illustrating the control device 20 according to this embodiment. The control device 20 includes a computer system. The control device 20 wirelessly communicates with the management device 4 via the communication system 7.

The control device 20 includes a communication unit 201, a target travel data acquisition unit 202, a vehicle speed data acquisition unit 203, an obstacle data acquisition unit 204, a position data acquisition unit 205, a travel control unit 206, a determination unit 207, and an abnormal data output unit 208.

The communication unit 201 receives data or a signal transmitted from the management device 4 via the communication system 7. In addition, the communication unit 201 transmits data or a signal to the management device 4 via the communication system 7.

The target travel data acquisition unit 202 acquires target travel data of the unmanned vehicle 2 from the management device 4.

The vehicle speed data acquisition unit 203 acquires, from the vehicle speed sensor 24, vehicle speed data indicating the traveling speed of the unmanned vehicle 2.

The obstacle data acquisition unit 204 acquires obstacle data indicating at least one of the presence or absence of an obstacle around the unmanned vehicle 2, the relative position to the obstacle, and the relative velocity to the obstacle from the non-contact sensor 25.

The position data acquisition unit 205 acquires position data indicating the absolute position of the unmanned vehicle 2 from the position sensor 26.

The travel control unit 206 controls the traveling device 21 on the basis of the target travel data acquired by the target travel data acquisition unit 202. The travel control unit 206 outputs the driving command including an accelerator command to operate the drive device 21D, a brake command to operate the brake device 21B, and a steering command to operate the steering device 21S to the traveling device 21 such that the unmanned vehicle 2 travels on the basis of the target travel data.

The determination unit 207 determines whether or not the abnormality occurs in the unmanned vehicle 2. The determination unit 207 determines whether or not the abnormality occurs in the unmanned vehicle 2 on the basis of at least one of the vehicle speed data acquired by the vehicle speed data acquisition unit 203, the obstacle data acquired by the obstacle data acquisition unit 204, and the position data acquired by the position data acquisition unit 205.

The abnormality of the unmanned vehicle 2 includes both an abnormality in the traveling state of the unmanned vehicle 2 and a cause of causing the abnormality in the traveling state of the unmanned vehicle 2.

The abnormality in the traveling state of the unmanned vehicle 2 includes a state in which the unmanned vehicle 2 is traveling under traveling conditions different from the target traveling conditions defined by the target travel data.

The abnormality in the traveling state of the unmanned vehicle 2 includes the state in which the unmanned vehicle 2 is stopped. For example, when the non-contact sensor 25 detects an obstacle, the travel control unit 206 stops the unmanned vehicle 2 on the basis of the obstacle data acquired by the obstacle data acquisition unit 204 in order to avoid contact between the unmanned vehicle 2 and the obstacle. In addition, when the unmanned vehicle 2 deviates from the target travel course, the travel control unit 206 stops the unmanned vehicle 2 on the basis of the position data of the unmanned vehicle 2 acquired by the position data acquisition unit 205. Incidentally, as a cause for the unmanned vehicle 2 to deviate from the target travel course, it is exemplified that the unmanned vehicle 2 slips due to the travel path getting wet due to, for example, rain water or sprinkling water.

Further, the abnormality in the traveling state of the unmanned vehicle 2 includes a state where the unmanned vehicle 2 is traveling at a traveling speed lower than the target traveling speed. For example, when the non-contact sensor 25 detects an obstacle, the travel control unit 206 may decelerate the unmanned vehicle 2 on the basis of the obstacle data acquired by the obstacle data acquisition unit 204. In addition, when the unmanned vehicle 2 deviates from the target travel course, the travel control unit 206 may decelerate the unmanned vehicle 2 on the basis of the position data of the unmanned vehicle 2 acquired by the position data acquisition unit 205.

That is, the abnormality in the traveling state of the unmanned vehicle 2 includes the abnormality in the traveling speed of the unmanned vehicle 2. On the basis of the target travel data acquired by the target travel data acquisition unit 202 and the vehicle speed data acquired by the vehicle speed data acquisition unit 203. If it is determined that the unmanned vehicle 2 is stopped or travels at a lower traveling speed than the target traveling speed even though the target traveling speed is specified, the determination unit 207 determines that the abnormality occurs in the traveling speed.

The cause of causing the abnormality in the traveling state of the unmanned vehicle 2 includes at least one of the cause of stopping the unmanned vehicle 2 and the cause of traveling the unmanned vehicle 2 at a traveling speed lower than the target traveling speed. When the unmanned vehicle 2 decelerates or stops due to the detection of the obstacle by the non-contact sensor 25, the cause for causing the abnormality in the traveling state of the unmanned vehicle 2 includes a state where the obstacle is detected by the non-contact sensor 25. In addition, when the unmanned vehicle 2 decelerates or stops due to the unmanned vehicle 2 deviating from the target traveling course, the cause for causing the abnormality in the traveling state of the unmanned vehicle 2 includes a state where the position sensor 26 detects that the unmanned vehicle 2 deviates from the target traveling course.

The abnormality of the unmanned vehicle 2 includes the abnormality of the drive system of the unmanned vehicle 2. The abnormality in the drive system of the unmanned vehicle 2 refers to an abnormality in a drive system that drives a traveling device such as an engine, a generator, and an electric motor.

The abnormal data output unit 208 outputs the abnormal data when the determination unit 207 determines that the abnormality occurs in the unmanned vehicle 2. The abnormal data output from the abnormal data output unit 208 includes stop data indicating that the unmanned vehicle 2 is stopped due to the occurrence of the abnormality. In addition, the abnormal data output from the abnormal data output unit 208 includes deceleration data indicating that the unmanned vehicle 2 is traveling at a traveling speed lower than the target traveling speed due to the occurrence of the abnormality.

The abnormal data output from the abnormal data output unit 208 includes cause data indicating a cause of causing an abnormality in the traveling state of the unmanned vehicle 2. When the unmanned vehicle 2 decelerates or stops due to detection of the obstacle by the non-contact sensor 25, the abnormal data output unit 208 outputs cause data indicating that the non-contact sensor 25 has detected the obstacle on the basis of the obstacle data acquired by the obstacle data acquisition unit 204. In addition, when the unmanned vehicle 2 decelerates or stops due to the unmanned vehicle 2 deviating from the target traveling course, the abnormal data output unit 208 outputs cause data indicating that the unmanned vehicle 2 has deviated from the target travel course on the basis of the position data of the unmanned vehicle 2 acquired by the position data acquisition unit 205. By outputting the cause data, for example, the cause of the abnormality can be known before the manned vehicle 3 arrives at the unmanned vehicle 2 which is stopped due to the occurrence of the abnormality. Accordingly, for example, it is possible to predict the time required to restart the unmanned vehicle 2 and to prepare in advance tools necessary for performing the processing of restarting the unmanned vehicle 2.

The abnormal data output from the abnormal data output unit 208 and the position data of the unmanned vehicle 2 in which the abnormality occurs are transmitted to the management device 4 via the communication system 7.

[Control Device]

Figure 4:
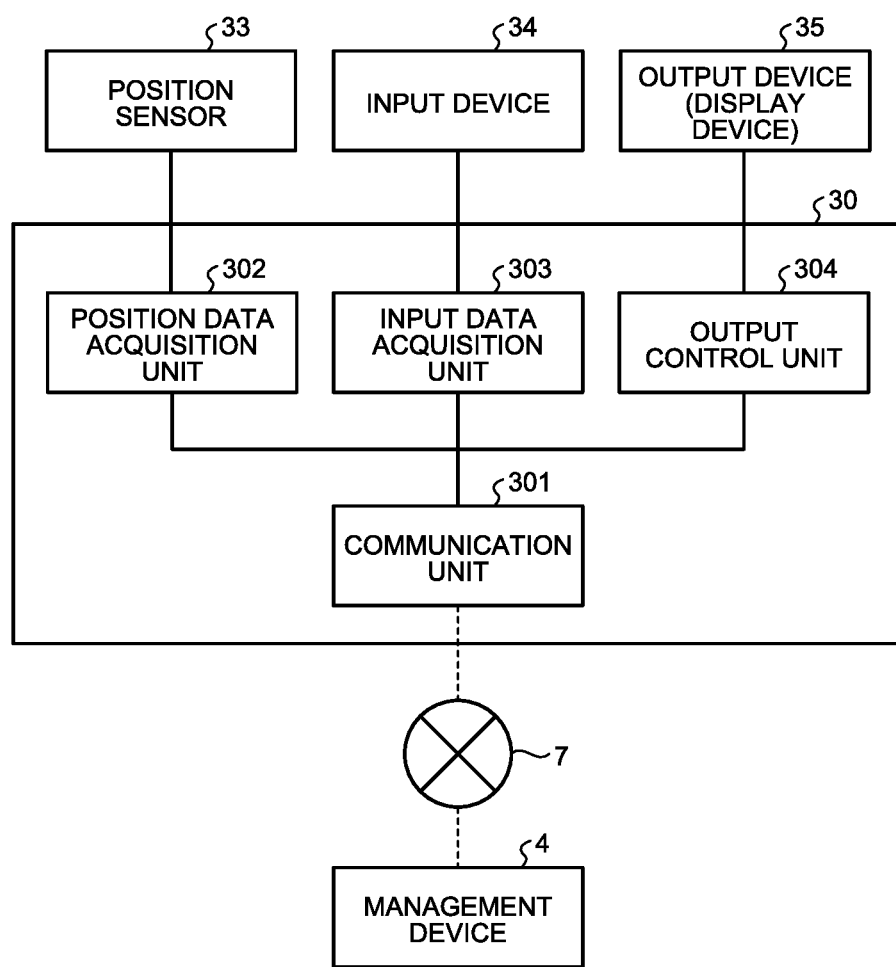
FIG. 4 is a functional block diagram illustrating the control device according to this embodiment.

FIG. 4 is a functional block diagram illustrating the control device 30 according to this embodiment. The control device 30 includes a computer system. The control device 30 wirelessly communicates with the management device 4 via the communication system 7.

The control device 30 includes a communication unit 301, a position data acquisition unit 302, an input data acquisition unit 303, and an output control unit 304.

The communication unit 301 receives data or a signal transmitted from the management device 4 via the communication system 7. In addition, the communication unit 301 transmits data or a signal to the management device 4 via the communication system 7.

The position data acquisition unit 302 acquires position data indicating the absolute position of the manned vehicle 3 from the position sensor 33.

The input data acquisition unit 303 acquires the input data generated by operating the input device 34 from the input device 34. The input data includes the consent data and the situation data described above.

The output control unit 304 controls the display device 35. The output control unit 304 outputs the display data to the display device 35. The display device 35 displays the display data output from the output control unit 304.

[Management Device]

Figure 5:
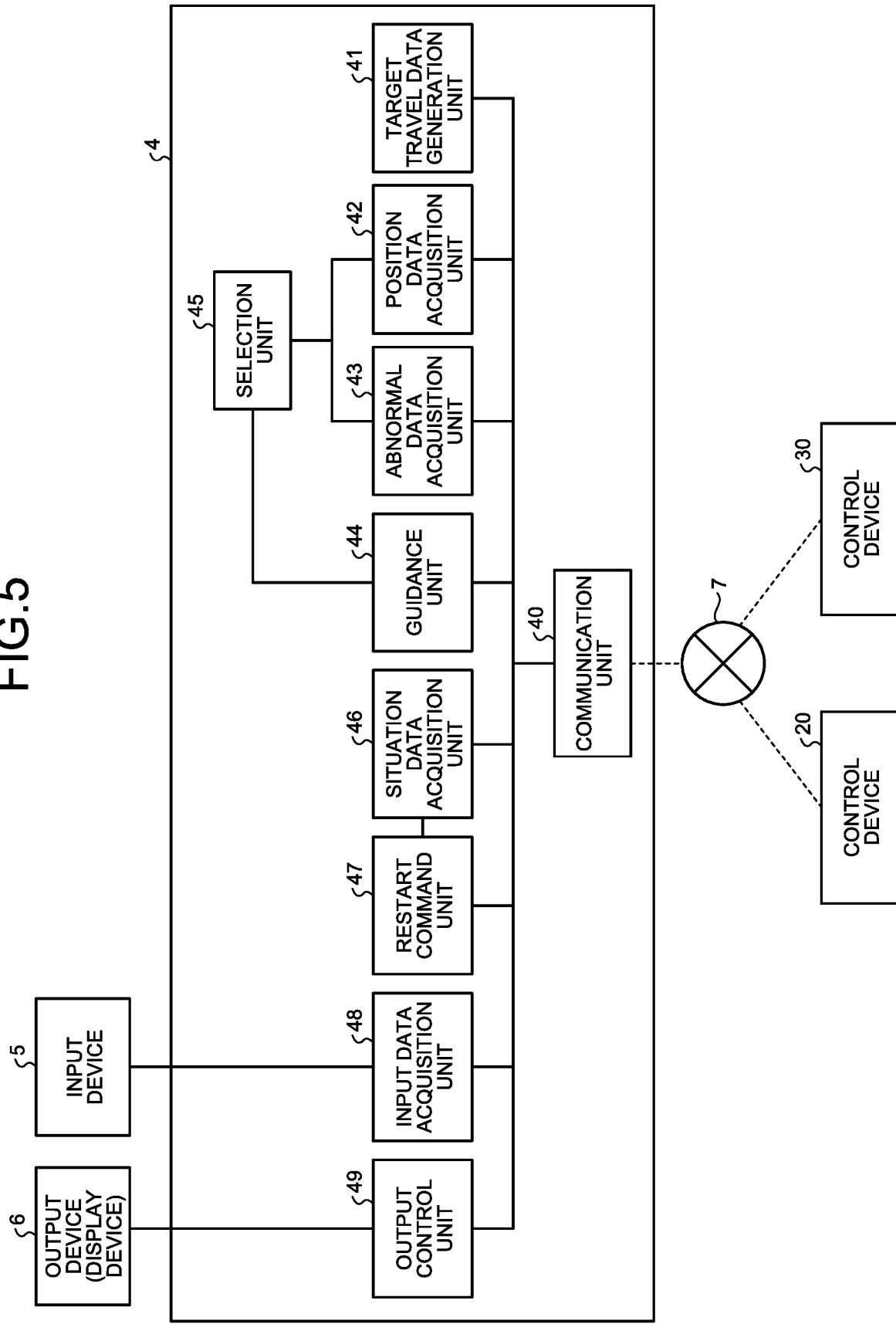
FIG. 5 is a functional block diagram illustrating a management device according to this embodiment.

FIG. 5 is a functional block diagram illustrating the management device 4 according to this embodiment. The management device 4 includes a computer system. The management device 4 wirelessly communicates with the control device 20 and the control device 30 via the communication system 7.

The management device 4 includes a communication unit 40, a target travel data generation unit 41, a position data acquisition unit 42, an abnormal data acquisition unit 43, a guidance unit 44, a selection unit 45, a situation data acquisition unit 46, a restart command unit 47, an input data acquisition unit 48, and an output control unit 49.

The communication unit 40 receives data or signals transmitted from the control device 20 and the control device 30 via the communication system 7. In addition, the communication unit 40 transmits data or signals to the control device 20 and the control device 30 via the communication system 7.

The target travel data generation unit 41 generates target travel data indicating the target travel condition of the unmanned vehicle 2. The target travel data includes a target travel speed and a target travel direction at each of a plurality of spaced points. The target acceleration is defined on the basis of the difference between the target traveling speeds of the adjacent points. The target travel course is defined by a trajectory connecting the plurality of points. The position of the point is defined in the global coordinate system. The target travel data generation unit 41 outputs target travel data to the control device 20 of the unmanned vehicle 2 via the communication system 7.

The position data acquisition unit 42 acquires position data of the unmanned vehicle 2 at the work site. The position data acquisition unit 42 acquires the position data of the unmanned vehicle 2 which is stopped at the work site due to the occurrence of the abnormality. The position data of the unmanned vehicle 2 is detected by the position sensor 26 mounted on the unmanned vehicle 2. The position data acquisition unit 42 acquires the position data of the unmanned vehicle 2 from the control device 20 via the communication system 7.

The position data acquisition unit 42 acquires position data of the manned vehicle 3 at the work site. The position data of the manned vehicle 3 is detected by the position sensor 33 mounted on the manned vehicle 3. The position data acquisition unit 42 acquires the position data of the manned vehicle 3 from the control device 30 via the communication system 7.

A plurality of unmanned vehicles 2 operate at the work site. The position data acquisition unit 42 acquires the position data of each of the plurality of unmanned vehicles 2. In addition, a plurality of manned vehicles 3 operate at the work site. The position data acquisition unit 42 acquires the position data of each of the plurality of manned vehicles 3.

The abnormal data acquisition unit 43 acquires the abnormal data output from the abnormal data output unit 208 of the unmanned vehicle 2. The abnormal data acquisition unit 43 acquires the abnormal data of the unmanned vehicle 2 from the control device 20 via the communication system 7.

The guidance unit 44 outputs, to the manned vehicle 3 of the work site, guidance data for guiding the manned vehicle 3 to the unmanned vehicle 2 stopped at the work site due to the occurrence of the abnormality. The guidance data includes the position data of the unmanned vehicle 2 which is stopped due to the abnormality. That is, the guidance unit 44 outputs, to the manned vehicle 3, the position data of the point where the unmanned vehicle 2 stops at the work site due to the occurrence of the abnormality and outputs the abnormal data. The guidance unit 44 outputs the position data of the unmanned vehicle 2 stopped due to the occurrence of the abnormality to the control device 30 of the manned vehicle 3 via the communication system 7.

The guidance unit 44 outputs the guidance data to the display device 35 provided in the manned vehicle 3. In this embodiment, the guidance unit 44 causes the display device 35 to display the position data of the unmanned vehicle 2 which is stopped due to the occurrence of the abnormality. When the position data of the unmanned vehicle 2 stopped due to the occurrence of the abnormality is displayed on the display device 35 of the manned vehicle 3, the driver Wa of the manned vehicle 3 can drive the manned vehicle 3 toward the stopped unmanned vehicle 2.

On the basis of the position data of the unmanned vehicle 2 stopped due to the occurrence of the abnormality and the position data of the manned vehicle 3, the guidance unit 44 calculates the optimum route data indicating the optimum route from the manned vehicle 3 to the stopped unmanned vehicle 2. The guidance data includes optimum route data from the manned vehicle 3 to the stopped unmanned vehicle 2. The guidance unit 44 outputs the optimum route data to the unmanned vehicle 2 stopped due to the occurrence of the abnormality to the control device 30 of the manned vehicle 3 via the communication system 7.

Incidentally, on the basis of the position data of the unmanned vehicle 2 stopped due to the occurrence of the abnormality and the position data of the manned vehicle 3, the guidance unit 44 may output, as the guidance data, the guidance data for guiding the optimum route from the manned vehicle 3 to the stopped unmanned vehicle 2 to the manned vehicle 3.

The guidance unit 44 outputs the optimum route data from the manned vehicle 3 to the unmanned vehicle 2 stopped due to the occurrence of the abnormality to be displayed on the display device 35 provided in the manned vehicle 3. When the optimum route data to the unmanned vehicle 2 having output the abnormal data is displayed on the display device 35 of the manned vehicle 3, the driver Wa of the manned vehicle 3 can drive the manned vehicle 3 toward the unmanned vehicle 2 in which the abnormality occurs.

The optimum route includes a travel route in which the time required for the manned vehicle 3 to reach the stopped unmanned vehicle 2 is the shortest among a plurality of travel routes connecting the manned vehicle 3 and the unmanned vehicle 2. For example, the optimum route includes the shortest travel route among the plurality of travel routes connecting the manned vehicle 3 and the unmanned vehicle 2. In addition, the optimum route includes a travel route with the smallest number of other unmanned vehicles 2 among the plurality of travel routes connecting the manned vehicle 3 and the unmanned vehicle 2.

The selection unit 45 selects a specific manned vehicle 3 from the plurality of manned vehicles 3 on the basis of the position data of the unmanned vehicle 2 and the position data of each of the plurality of manned vehicles 3. The guidance unit 44 outputs the position data of the unmanned vehicle 2 stopped due to the occurrence of the abnormality to the display device 35 provided in the specific manned vehicle 3 selected by the selection unit 45.

The specific manned vehicle 3 includes the manned vehicle 3 with the shortest distance to the unmanned vehicle 2 stopped due to the occurrence of the abnormality among the plurality of manned vehicles 3 operating at the work site. The manned vehicle 3 with the shortest distance to the unmanned vehicle 2 stopped due to the occurrence of the abnormality is guided to the unmanned vehicle 2. Accordingly, the traveling distance or traveling time until the manned vehicle 3 arrives at the unmanned vehicle 2 stopped due to the occurrence of the abnormality is shortened.

The situation data acquisition unit 46 acquires the situation data indicating the situation of the unmanned vehicle 2 output from the input data acquisition unit 303 of the manned vehicle 3. The situation data is data for determining whether or not the unmanned vehicle 2 can resume traveling. The driver Wa of the manned vehicle 3 arriving at the stopped unmanned vehicle 2 ascertains the situation of the unmanned vehicle 2 and operates the input device 34 when it is determined that the unmanned vehicle 2 can resume the performing. The input device 34 generates situation data indicating that the unmanned vehicle 2 can resume the traveling. The situation data acquisition unit 46 acquires the situation data indicating that the unmanned vehicle 2 can resume traveling via the communication system 7.

The restart command unit 47 outputs a restart command to restart the unmanned vehicle 2 on the basis of the situation data of the unmanned vehicle 2 acquired by the situation data acquisition unit 46. The restart of the unmanned vehicle 2 means to restart the traveling of the unmanned vehicle 2 stopped due to the occurrence of the abnormality on the basis of the target travel data. The restart command refers to a command to cause the unmanned vehicle 2 stopped due to the occurrence of the abnormality to restart traveling on the basis of the target travel data. The restart command unit 47 outputs the restart command to the control device 20 of the unmanned vehicle 2 via the communication system 7. By outputting the restart command, the stopped unmanned vehicle 2 restarts the traveling on the basis of the target travel data.

The situation data is a determination criterion when it is determined whether or not to transmit the restart command to the unmanned vehicle 2. As described above, the situation data includes surrounding image data of the unmanned vehicle 2. The situation data may be a signal indicating that there is no problem in restarting the unmanned vehicle 2. The driver Wa of the manned vehicle 3 that has arrived at the unmanned vehicle 2 stopped due to the occurrence of the abnormality ascertains the situation around the stopped unmanned vehicle 2 and transmits the situation data to the management device 4. The driver Wa of the manned vehicle 3 can transmit the surrounding image data of the unmanned vehicle 2 to the management device 4 using, for example, a portable terminal equipped with a camera or can operate an input device provided on the portable terminal such that a signal indicating that there is no problem in restarting the unmanned vehicle 2 is transmitted to the management device 4.

The input data acquisition unit 48 acquires the input data generated by operating the input device 5 from the input device 5.

The output control unit 49 controls the display device 6. The output control unit 49 outputs the display data to the display device 6. The display device 6 displays the display data output from the output control unit 49.

[Operation of Unmanned Vehicle]

Figure 6:
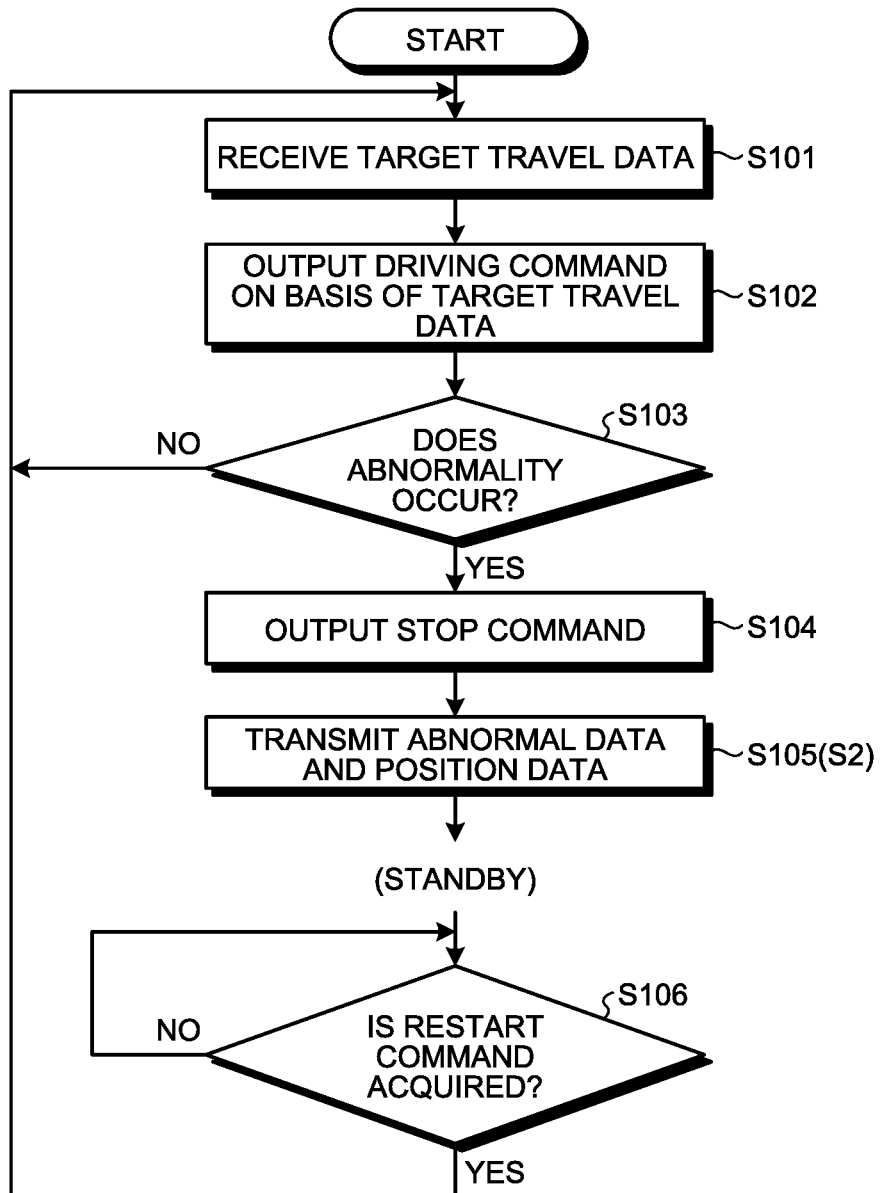
FIG. 6 is a flowchart illustrating an operation of an unmanned vehicle according to this embodiment.

FIG. 6 is a flowchart illustrating the operation of the unmanned vehicle 2 according to this embodiment. The target travel data of the unmanned vehicle 2 generated by the target travel data generation unit 41 is transmitted from the management device 4 to the control device 20 via the communication system 7. The target travel data acquisition unit 202 receives the target travel data from the management device 4 via the communication system 7 (Step S101).

The travel control unit 206 outputs the driving command to the traveling device 21 on the basis of the target travel data acquired by the target travel data acquisition unit 202 (Step S102). The unmanned vehicle 2 travels on the basis of the target travel data.

The determination unit 207 determines whether or not a cause for generating the abnormality in the traveling state of the unmanned vehicle 2 occurs on the basis of at least one of the obstacle data acquired by the obstacle data acquisition unit 204 and the position data of the unmanned vehicle 2 acquired by the position data acquisition unit 205 (Step S103).

In Step S103, in a case where it is determined that the cause of causing the abnormality in the traveling state of the unmanned vehicle 2 is not generated (Step S103: No), the unmanned vehicle 2 continues traveling on the basis of the target traveling data.

If it is determined in Step S103 that the cause of the abnormality in the traveling state of the unmanned vehicle 2 occurs (Step S103: Yes), the travel control unit 206 outputs a stop command to stop the unmanned vehicle 2 to the traveling device 21 (Step S104). Incidentally, in a case where it is determined that the cause of generating the abnormality in the traveling state of the unmanned vehicle 2 occurs, the travel control unit 206 may output a deceleration command for decelerating the unmanned vehicle 2 to the traveling device 21.

The abnormal data output unit 208 outputs the abnormal data indicating that the abnormality occurs in the unmanned vehicle 2. The abnormal data output unit 208 transmits the abnormal data to the management device 4 via the communication system 7. In addition, the abnormal data output unit 208 transmits the position data of the unmanned vehicle 2 stopped due to the occurrence of the abnormality to the management device 4 via the communication system 7 (Step S105). The processing of Step S105 corresponds to the processing of Step S2 described with reference to FIG. 2.

The manned vehicle 3 travels to the stopped unmanned vehicle 2, and the driver Wa of the manned vehicle 3 ascertains the situation of the unmanned vehicle 2. As a result of ascertaining the situation of the unmanned vehicle 2, in a case where it is determined that the unmanned vehicle 2 can resume the traveling, the management device 4 transmits the restart command to the control device 20 via the communication system 7 (see Step S7 of FIG. 2). On the other hand, when it is determined that the unmanned vehicle 2 cannot resume the traveling, the restart command is not transmitted from the management device 4 to the control device 20. The travel control unit 206 determines whether or not the restart command is acquired from the management device 4 (Step S106).

When it is determined in Step S106 that the restart command is not acquired (Step S106: No), the unmanned vehicle 2 maintains the stopped state.

When it is determined in Step S106 that the restart command is acquired (Step S106: Yes), the travel control unit 206 outputs a driving command to the traveling device 21 on the basis of the target traveling data. The unmanned vehicle 2 resumes the traveling on the basis of the target travel data.

[Operation of Management Device]

Figure 7:
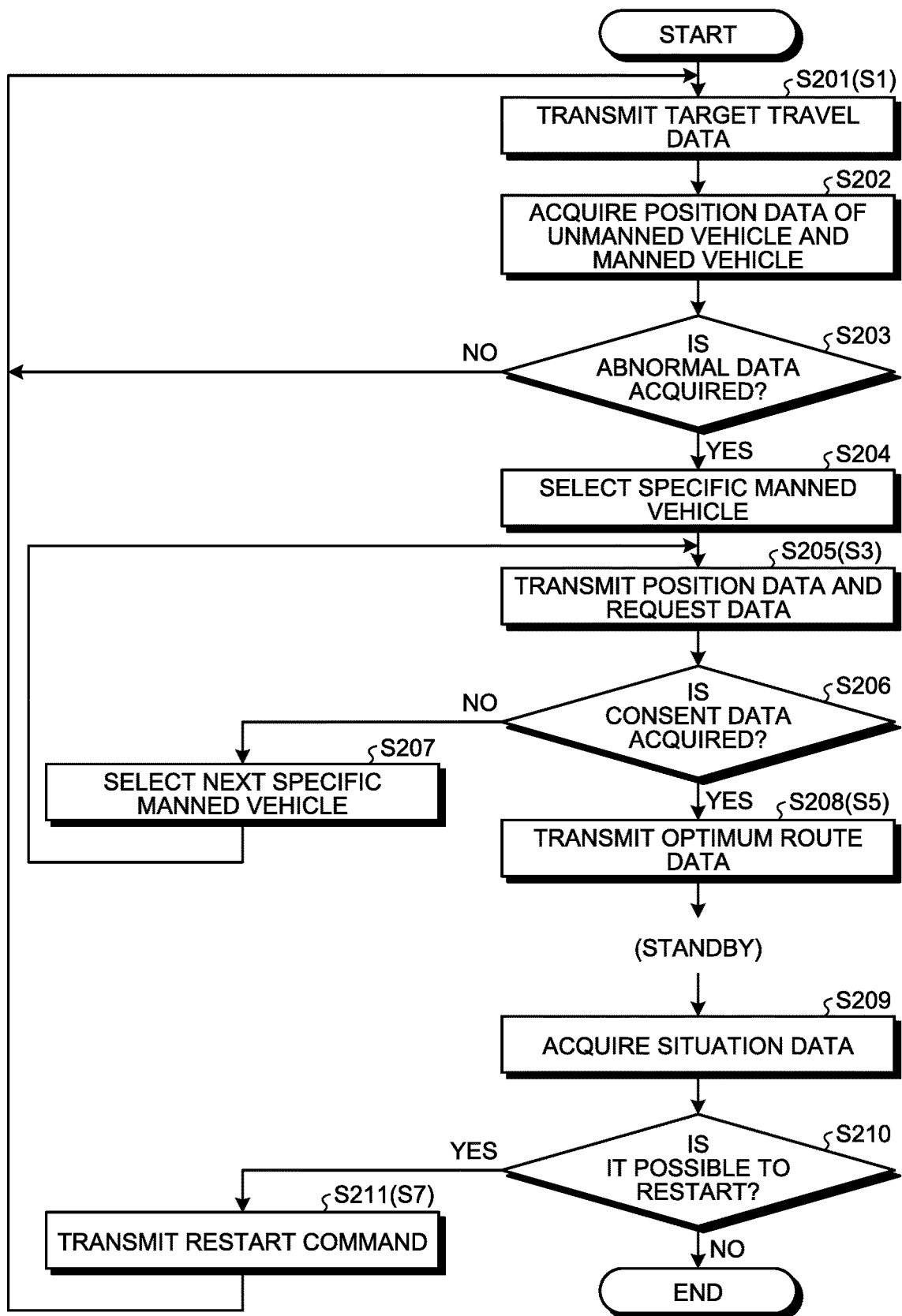
FIG. 7 is a flowchart illustrating an operation of the management device according to this embodiment.

FIG. 7 is a flowchart illustrating the operation of the management device 4 according to this embodiment. The target travel data generation unit 41 generates the target travel data of the unmanned vehicle 2. The target travel data generation unit 41 transmits the target travel data to the control device 20 via the communication system 7 (Step S201). The processing of Step S201 corresponds to the processing of Step S1 described with reference to FIG. 2.

The position data acquisition unit 42 acquires the position data of the unmanned vehicle 2 operating at the work site and the position data of the manned vehicle 3 via the communication system 7 (Step S202). When a plurality of unmanned vehicles 2 are present at the work site, the position data acquisition unit 42 acquires the position data of each of the plurality of unmanned vehicles 2. When a plurality of manned vehicles 3 are present at the work site, the position data acquisition unit 42 acquires the position data of each of the plurality of manned vehicles 3.

When the abnormality occurs in the unmanned vehicle 2, the control device 20 transmits the position data and the abnormal data of the unmanned vehicle 2 in which the abnormality occurs to the management device 4 via the communication system 7 (see Step S2 of FIG. 2). On the other hand, when no abnormality occurs in the unmanned vehicle 2, the abnormality data is not transmitted from the control device 20 to the management device 4. The abnormal data acquisition unit 43 determines whether or not the abnormal data is acquired from the unmanned vehicle 2 (Step S203).

When it is determined in Step S203 that the abnormal data is not acquired (Step S203: No), the management device 4 performs the processing of Step S201. The unmanned vehicle 2 maintains normal traveling.

When it is determined in Step S203 that the abnormal data is acquired (Step S203: Yes), the management device 4 starts the processing of guiding the manned vehicle 3 to the unmanned vehicle 2 stopped due to the occurrence of the abnormality.

The selection unit 45 selects a specific manned vehicle 3 from the plurality of manned vehicles 3 on the basis of the position data of the unmanned vehicle 2 in which the abnormality occurs and the position data of each of the plurality of manned vehicles 3 present at the work site (Step S204).

The selection unit 45 selects, as the specific manned vehicle 3, the manned vehicle 3 having the shortest distance (linear distance) to the unmanned vehicle 2 stopped due to the occurrence of the abnormality among the plurality of manned vehicles 3.

Figure 8:
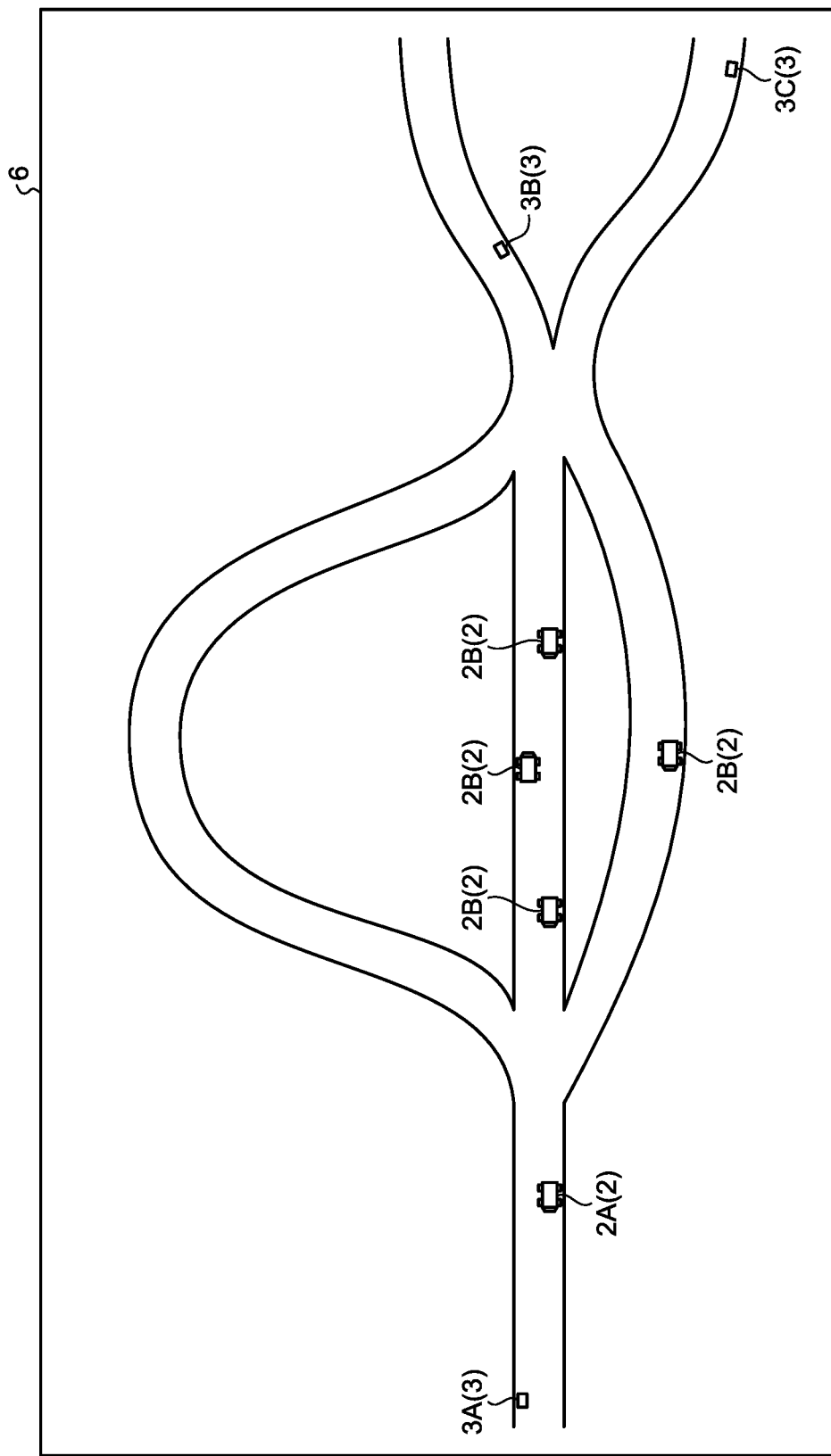
FIG. 8 is a view illustrating an example of a display device according to this embodiment.

FIG. 8 is a view illustrating an example of the display device 6 according to this embodiment. As illustrated in FIG. 8, the output control unit 49 causes the display device 6 to display the map data of the work site, the position data of the unmanned vehicle 2, and the position data of the manned vehicle 3. The output control unit 49 causes the display device 6 to display the icon of the unmanned vehicle 2 as the position data of the unmanned vehicle 2. In addition, the output control unit 49 causes the display device 6 to display the icon of the manned vehicle 3 as the position data of the manned vehicle 3. For example, when the positions of the unmanned vehicle 2 and the manned vehicle 3 change due to traveling, the output control unit 49 updates the position of the icon of the unmanned vehicle 2 on the display screen of the display device 6 and moves the icon of the unmanned vehicle 2 on the basis of the position data of the unmanned vehicle 2. Accordingly, the administrator Wb can intuitively recognize the position of the unmanned vehicle 2 and the position of the manned vehicle 3 at the work site through vision.

In the example illustrated in FIG. 8, it is assumed that an unmanned vehicle 2A is stopped due to the occurrence of the abnormality in the unmanned vehicle 2A. Another unmanned vehicle 2B is traveling. In addition, manned vehicles 3A, 3B and 3C are assumed to be present at the work site.

The output control unit 49 may cause the display device 6 to display the display mode of the unmanned vehicle 2A stopped due to the occurrence of the abnormality and the display mode of the other unmanned vehicle 2B differently. For example, the output control unit 49 may cause the display device 6 to display at least one of the design, the hue, the lightness, and the saturation of the icon of the unmanned vehicle 2A and the icon of the unmanned vehicle 2B differently. Further, the output control unit 49 may continuously display one of the icon of the unmanned vehicle 2A and the icon of the unmanned vehicle 2B and blink the other.

The selection unit 45 can calculate the distance between the unmanned vehicle 2A and the manned vehicle 3A on the basis of the position data of the unmanned vehicle 2A and the position data of the manned vehicle 3A. Similarly, the selection unit 45 can calculate the distance between the unmanned vehicle 2A and the manned vehicle 3B and the distance between the unmanned vehicle 2A and the manned vehicle 3C.

In the example illustrated in FIG. 8, the distance between the unmanned vehicle 2A and the manned vehicle 3A is the shortest, then the distance between the unmanned vehicle 2A and the manned vehicle 3B is short, and the distance between the unmanned vehicle 2A and the manned vehicle 3C is the longest.

The selection unit 45 selects, as the specific manned vehicle 3, the manned vehicle 3A with the shortest distance to the unmanned vehicle 2A stopped due to the occurrence of abnormality among the plurality of manned vehicles 3A, 3B, and 3C.

The guidance unit 44 outputs, to the manned vehicle 3A selected by the selection unit 45, the request data for requesting traveling toward the unmanned vehicle 2A stopped due to the occurrence of the abnormality. The guidance unit 44 transmits the position data of the stopped unmanned vehicle 2A stopped due to the occurrence of the abnormality and the request data for requesting traveling toward the unmanned vehicle 2A to the manned vehicle 3A selected by the selection unit 45 via the communication system 7 (Step S205). The processing of Step S205 corresponds to the processing of Step S3 described with reference to FIG. 2.

The manned vehicle 3A receives the position data of unmanned vehicle 2A and the request data. The guidance unit 44 causes the display device 35 provided in the manned vehicle 3A to display the position data of the unmanned vehicle 2A and the request data.

In a case where the driver Wa of the manned vehicle 3A consents to travel toward the unmanned vehicle 2A, the driver Wa operates the input device 34 to generate the consent data for consenting to travel toward the unmanned vehicle 2A. On the other hand, when the driver Wa of the manned vehicle 3A refuses to travel toward the unmanned vehicle 2A, the driver Wa operates the input device 34 to generate refusal data for refusing to travel toward the unmanned vehicle 2A. For example, when the driver Wa or the manned vehicle 3 is performing other work, it may be difficult or impossible for the manned vehicle 3A to travel toward the unmanned vehicle 2A. When it is difficult or impossible for the manned vehicle 3A to travel toward the unmanned vehicle 2A, the driver Wa of the manned vehicle 3A operates the input device 34 provided in the manned vehicle 3 to generate the refusal data of refusing to travel toward the unmanned vehicle 2A. The consent data or refusal data generated by the input device 34 is transmitted to the management device 4 via the communication system 7.

The selection unit 45 acquires the consent data or refusal data for the request data from the manned vehicle 3A via the communication system 7. The selection unit 45 determines whether or not the consent data is acquired from the manned vehicle 3A (Step S206).

When it is determined in Step S206 that the refusal data is acquired from the manned vehicle 3A (Step S206: No), the selection unit 45 selects the next specific manned vehicle 3 from the plurality of manned vehicles 3 (Step S207). Among the plurality of manned vehicles 3A, 3B, and 3C, the selection unit 45 selects, as the next specific manned vehicle 3, the manned vehicle 3B of which the distance (linear distance) to the unmanned vehicle 2A in which the abnormality occurs is short after manned vehicle 3A.

The guidance unit 44 transmits the position data of the unmanned vehicle 2A and the request data to the manned vehicle 3B selected by the selection unit 45 (Step S205). The selection unit 45 determines whether or not the consent data is acquired from manned vehicle 3B (Step S206).

When the consent data cannot be acquired from the manned vehicle 3B, the manned vehicle 3C of which the distance to the unmanned vehicle 2A is short after the manned vehicle 3B is selected as the next specific manned vehicle 3, and the position data of the unmanned vehicle 2A and the request data are transmitted to the manned vehicle 3C. Hereinafter, until the consent data is acquired, the manned vehicle 3 having a short distance to the unmanned vehicle 2A is sequentially selected, and the processing of transmitting the position data of the unmanned vehicle 2A and the request data is performed.

In this embodiment, the consent data is output from the manned vehicle 3B. When it is determined in Step S206 that the consent data is acquired from the manned vehicle 3B (Step S206: Yes), the guidance unit 44 outputs the optimum route to the unmanned vehicle 2A to the manned vehicle 3B on the basis of the position data of the unmanned vehicle 2A and the position data of the manned vehicle 3B.

Figure 9:
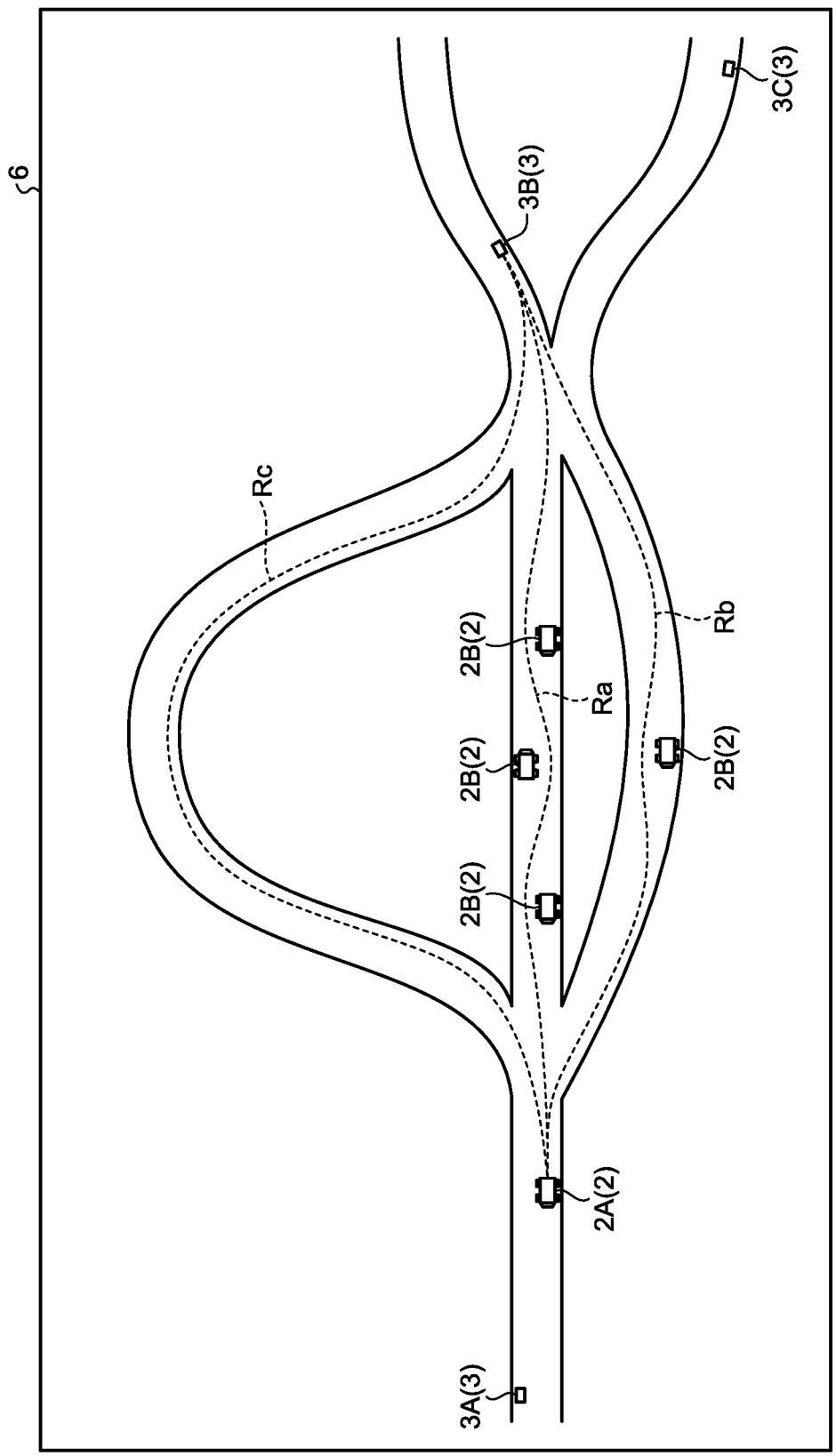
FIG. 9 is a view illustrating an example of a travel route from a manned vehicle to the unmanned vehicle according to this embodiment.

FIG. 9 is a view illustrating an example of the travel route from the manned vehicle 3B to the unmanned vehicle 2A according to this embodiment. As illustrated in FIG. 9, a plurality of travel routes Ra, Rb, and Rc connecting the manned vehicle 3B and the unmanned vehicle 2A are present at the work site. The travel route Ra is a travel route with the shortest travel distance from the manned vehicle 3B to the unmanned vehicle 2A among the plurality of travel routes Ra, Rb, and Rc. The travel route Rb is a travel route of which the travel distance from the manned vehicle 3B to the unmanned vehicle 2A among the plurality of travel routes Ra, Rb, and Rc is short after the travel route Ra. The travel route Rc is a travel route with the longest travel distance from the manned vehicle 3B to the unmanned vehicle 2A among the plurality of travel routes Ra, Rb, and Rc.

In the travel route Ra, three unmanned vehicles 2B are traveling. In the travel route Rb, one unmanned vehicle 2B is traveling. In the travel route Rc, the unmanned vehicle 2B is not traveling. That is, the travel route Ra is a travel route having the largest number of other unmanned vehicles 2B among the plurality of travel routes Ra, Rb, and Rc. The travel route Rb is a travel route in which the number of other unmanned vehicles 2B is large after the travel route Ra among the plurality of travel routes Ra, Rb, and Rc. The travel route Rc is a travel route with the smallest number of other unmanned vehicles 2B among the plurality of travel routes Ra, Rb, and Rc.

The guidance unit 44 may output, to the manned vehicle 3B, the travel route Ra with the shortest travel distance of the manned vehicle 3B as the optimum route from the manned vehicle 3B to the unmanned vehicle 2A. The guidance unit 44 may output, to the manned vehicle 3B, the travel route Rc with the smallest number of other unmanned vehicles 2B as the optimum route from the manned vehicle 3B to the unmanned vehicle 2A. In this embodiment, the guidance unit 44 outputs, to the manned vehicle 3B, the travel route Rb as an optimum route from the manned vehicle 3B to the unmanned vehicle 2A.

The guidance unit 44 transmits the optimum route data indicating the optimum route Rb to the unmanned vehicle 2A to the manned vehicle 3B via the communication system 7 (Step S208). The processing of Step S208 corresponds to the processing of Step S5 described with reference to FIG. 2.

The guidance unit 44 causes the display device 35 provided in the manned vehicle 3B to display the optimum route data to the unmanned vehicle 2A. The driver Wa of the manned vehicle 3B can drive the manned vehicle 3B toward the unmanned vehicle 2A in which the abnormality occurs while viewing the optimum route Rb displayed on the display device 35. The driver Wa of the manned vehicle 3B that has arrived at the unmanned vehicle 2A ascertains the situation of the unmanned vehicle 2A. Incidentally, the control device 30 of the manned vehicle 3B may transmit arrival data indicating that the manned vehicle 3B has arrived at the unmanned vehicle 2A.

For example, when the control device 20 of the unmanned vehicle 2A determines that an obstacle is present around the unmanned vehicle 2A on the basis of the detection data of the non-contact sensor 25 and stops the unmanned vehicle 2A, actually, the obstacle may not be present. For example, when the non-contact sensor 25 erroneously detects the unevenness of the traveling path as an obstacle, actually, the unmanned vehicle 2A may stop although the unmanned vehicle 2A can continue traveling. When the driver Wa ascertains the situation of the unmanned vehicle 2A and determines that there is no obstacle actually, and the unmanned vehicle 2A can travel, the driver operates the input device 34 to generate the situation data indicating that the unmanned vehicle 2A can travel. On the other hand, when the driver Wa ascertains the situation of the unmanned vehicle 2A and determines that the obstacle is actually present, and the unmanned vehicle 2A cannot travel, the driver operates the input device 34 to generate the situation data indicating that the unmanned vehicle 2A cannot travel. The control device 30 transmits the situation data indicating the situation of unmanned vehicle 2A to the management device 4 via communication system 7 (see Step S6 of FIG. 2).

The situation data acquisition unit 46 acquires the situation data from the control device 30 via the communication system 7 (Step S209).

The restart command unit 47 determines whether or not the unmanned vehicle 2A can be restarted on the basis of the situation data of the unmanned vehicle 2A acquired by the situation data acquisition unit 46 (Step S210).

When it is determined in Step S210 that the unmanned vehicle 2A cannot be restarted (Step S210: No), the output control unit 49 causes the display device 6 to display the display data indicating that the unmanned vehicle 2A cannot be restarted. For example, when the situation data indicating that the unmanned vehicle 2A cannot travel is transmitted from the control device 30, the restart command unit 47 determines that the unmanned vehicle 2A cannot be restarted. The output control unit 49 causes the display device 6 to display the display data indicating that the unmanned vehicle 2A cannot be restarted. For example, the administrator Wb can command the driver Wa or another worker to remove the obstacle present around the unmanned vehicle 2A while viewing the display device 6.

When it is determined in Step S210 that the unmanned vehicle 2A can be restarted (Step S210: Yes), the restart command unit 47 outputs the restart command to restart the unmanned vehicle 2A. For example, when situation data indicating that the unmanned vehicle 2A can travel is transmitted from the control device 30, the restart command unit 47 determines that the unmanned vehicle 2A can be restarted and outputs the restart command. Incidentally, the restart command unit 47 may output the restart command on the basis of the input data generated by the administrator Wb operating the input device 5. The restart command unit 47 transmits the restart command to the unmanned vehicle 2A via the communication system 7 (Step S211). The processing of Step S211 corresponds to the processing of Step S7 described with reference to FIG. 2.

The unmanned vehicle 2A that has acquired the restart command restarts traveling on the basis of the target travel data.

[Operation of Manned Vehicle]

Figure 10:
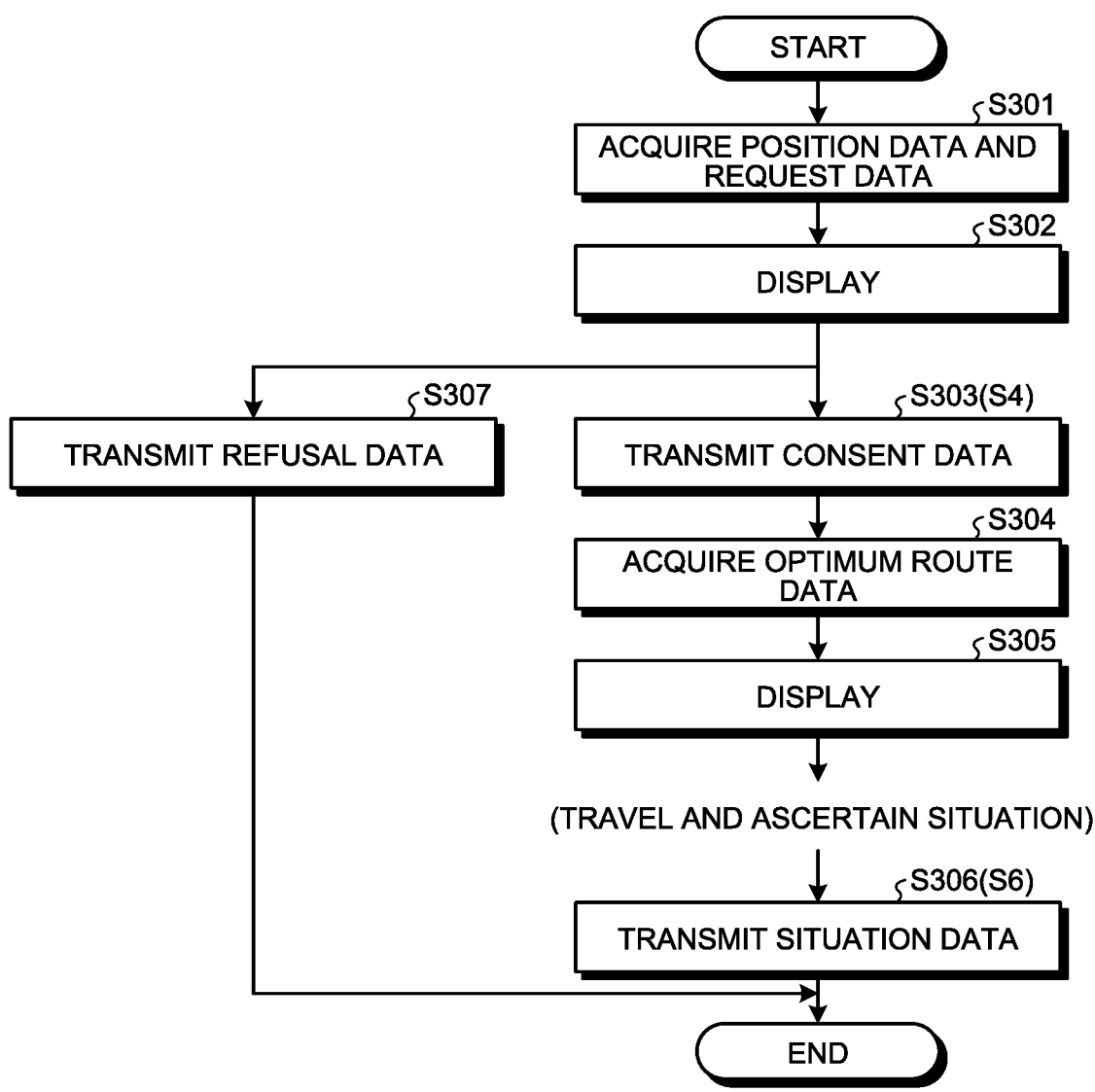
FIG. 10 is a flowchart illustrating an operation of the manned vehicle according to this embodiment.

FIG. 10 is a flowchart illustrating the operation of the manned vehicle 3 according to this embodiment. When the abnormality occurs in the unmanned vehicle 2A, the management device 4 performs the processing of Step S205 (Step S3) described above. That is, the management device 4 transmits the position data of the unmanned vehicle 2A stopped due to the occurrence of the abnormality to the manned vehicle 3A and the request data via the communication system 7. The output control unit 304 acquires the position data of the unmanned vehicle 2A and the request data (Step S301).

The output control unit 304 causes the display device 35 to display the position data of the unmanned vehicle 2A and the request data (Step S302).

Figure 11:
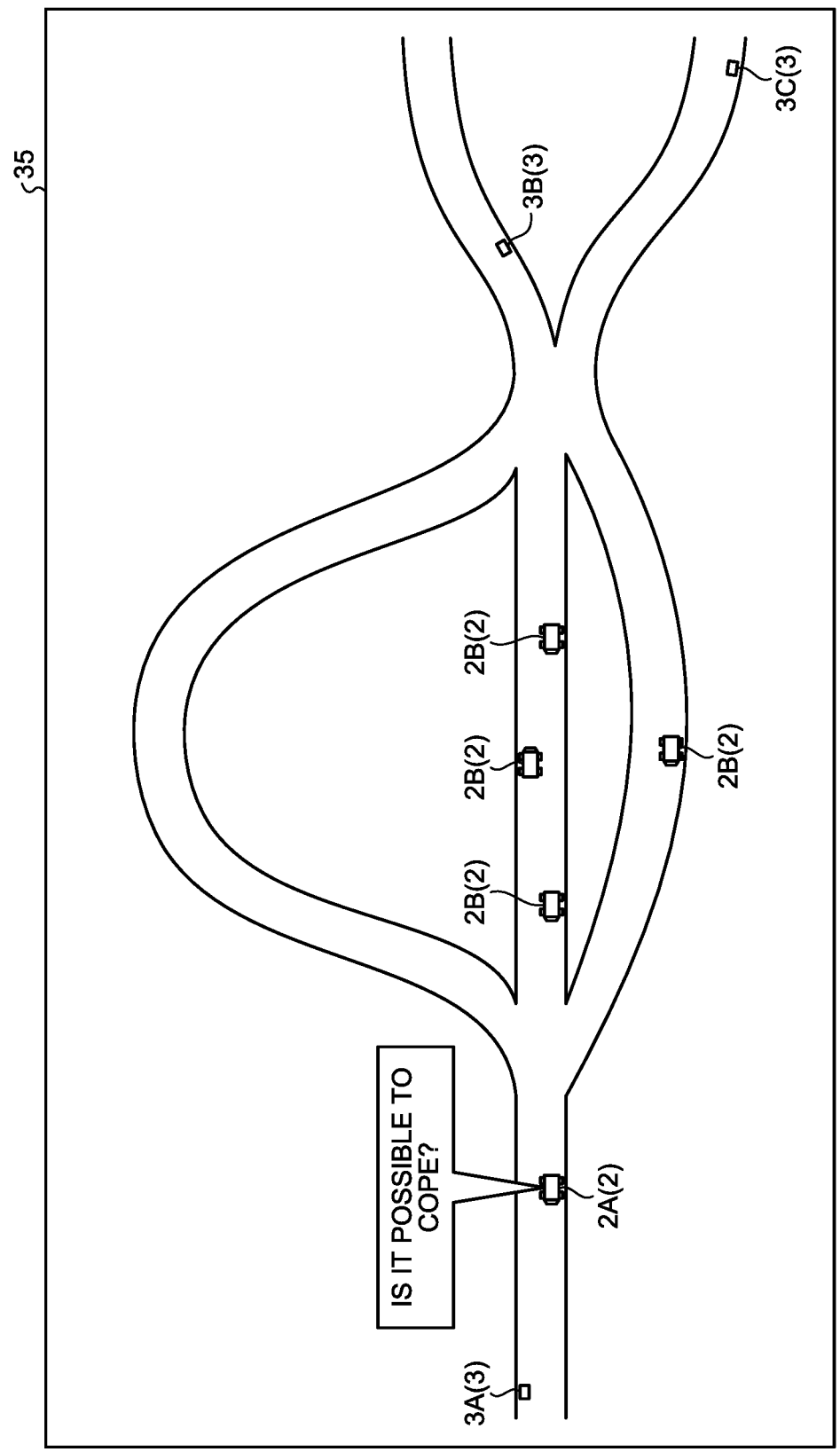
FIG. 11 is a view illustrating an example of the display device according to this embodiment.

FIG. 11 is a diagram illustrating an example of the display device 35 according to this embodiment. As illustrated in FIG. 11, the output control unit 304 causes the display device 35 to display the map data of the work site, the position data of the unmanned vehicle 2A, and the position data of the manned vehicle 3B. The output control unit 304 causes the display device 35 to display the icon of the unmanned vehicle 2A as the position data of the unmanned vehicle 2A. In addition, the output control unit 304 causes the display device 35 to display the icon of the manned vehicle 3B as the position data of the manned vehicle 3B. Accordingly, the driver Wa can intuitively recognize the position of the unmanned vehicle 2A and the position of the manned vehicle 3B at the work site through vision.

The output control unit 304 may cause the display device 35 to display the display modes of the unmanned vehicle 2A and the manned vehicle 3B and the display modes of the other unmanned vehicle 2B and the other manned vehicles 3A and 3C differently from each other. For example, the output control unit 304 may cause the display device 6 to display at least one of the design, the hue, the lightness, and the saturation of the icon of the unmanned vehicle 2A and the icon of the unmanned vehicle 2B differently. In addition, the output control unit 304 may continuously display one of the icon of the unmanned vehicle 2A and the icon of the unmanned vehicle 2B and blink the other. For example, the output control unit 304 may cause the display device 35 to display at least one of the design, the hue, the lightness, and the saturation of the icon of the manned vehicle 3B and the icons of the manned vehicles 3A and 3C differently. In addition, the output control unit 304 may continuously display one of the icon of the manned vehicle 3B and the icons of the manned vehicles 3A and 3C and blink the others.

For example, when the positions of the unmanned vehicle 2B changes due to traveling, the output control unit 304 updates the position of the icon of the unmanned vehicle 2B on the display screen of the display device 35 and moves the icon of the unmanned vehicle 2B on the basis of the position data of the unmanned vehicle 2B. In addition, for example, when the positions of the manned vehicles 3A and 3C change due to traveling, the output control unit 304 updates the positions of the icons of the manned vehicles 3A and 3C on the display screen of the display device 35 and moves the icons of the manned vehicles 3A and 3C on the basis of the position data of the manned vehicles 3A and 3C.

Incidentally, the output control unit 304 may also cause the display device 35 to display the position data of another unmanned vehicle 2B and the position data of other manned vehicles 3A and 3C.

The output control unit 304 causes the display device 35 to display the guidance data for guiding the optimum route from the manned vehicle 3 to the stopped unmanned vehicle 2 as the guidance data on the basis of the position data of the unmanned vehicle 2A stopped due to the occurrence of the abnormality and the position data of the manned vehicle 3B.

In this embodiment, the guidance data includes an icon indicating the position of the unmanned vehicle 2 (2A, 2B) described above, an icon indicating the position of the manned vehicle 3 (3A, 3B, 3C), and guidance data. Incidentally, the output control unit 304 may cause the display device 35 to display the position data (icon) of the unmanned vehicle 2, the position data (icon) of the manned vehicle 3, and the guidance data on the basis of the absolute position.

Character data such as "is it possible to cope?" is popped up and displayed as the request data for requesting traveling toward the unmanned vehicle 2A to the unmanned vehicle 2A. Incidentally, the display example of the request data illustrated in FIG. 11 is an example, and the invention is not limited to the example illustrated in FIG. 11. For example, an audio may be output to the driver's cab of the manned vehicle 3B as request data.

In a case where the driver Wa of the manned vehicle 3B consents to travel toward the unmanned vehicle 2A, the driver Wa operates the input device 34 to generate the consent data for consenting traveling toward the unmanned vehicle 2A. The consent data is acquired by the input data acquisition unit 303. The input data acquisition unit 303 transmits the consent data to the management device 4 via the communication system 7 (Step S303). The processing of Step S303 corresponds to the processing of Step S4 described with reference to FIG. 2.

Incidentally, in a case where the driver Wa of the manned vehicle 3B refuses to travel toward the unmanned vehicle 2A, the driver Wa operates the input device 34 to generate refusal data that refuses to travel toward the unmanned vehicle 2A. The input data acquisition unit 303 transmits the refusal data to the management device 4 via the communication system 7 (Step S307).

The management device 4 generates the optimum route data and transmits the optimum route data to the control device 30 via the communication system 7. The output control unit 304 acquires the optimum route data (Step S304).

The output control unit 304 causes the display device 35 to display the optimum route data (Step S305).

Figure 12:
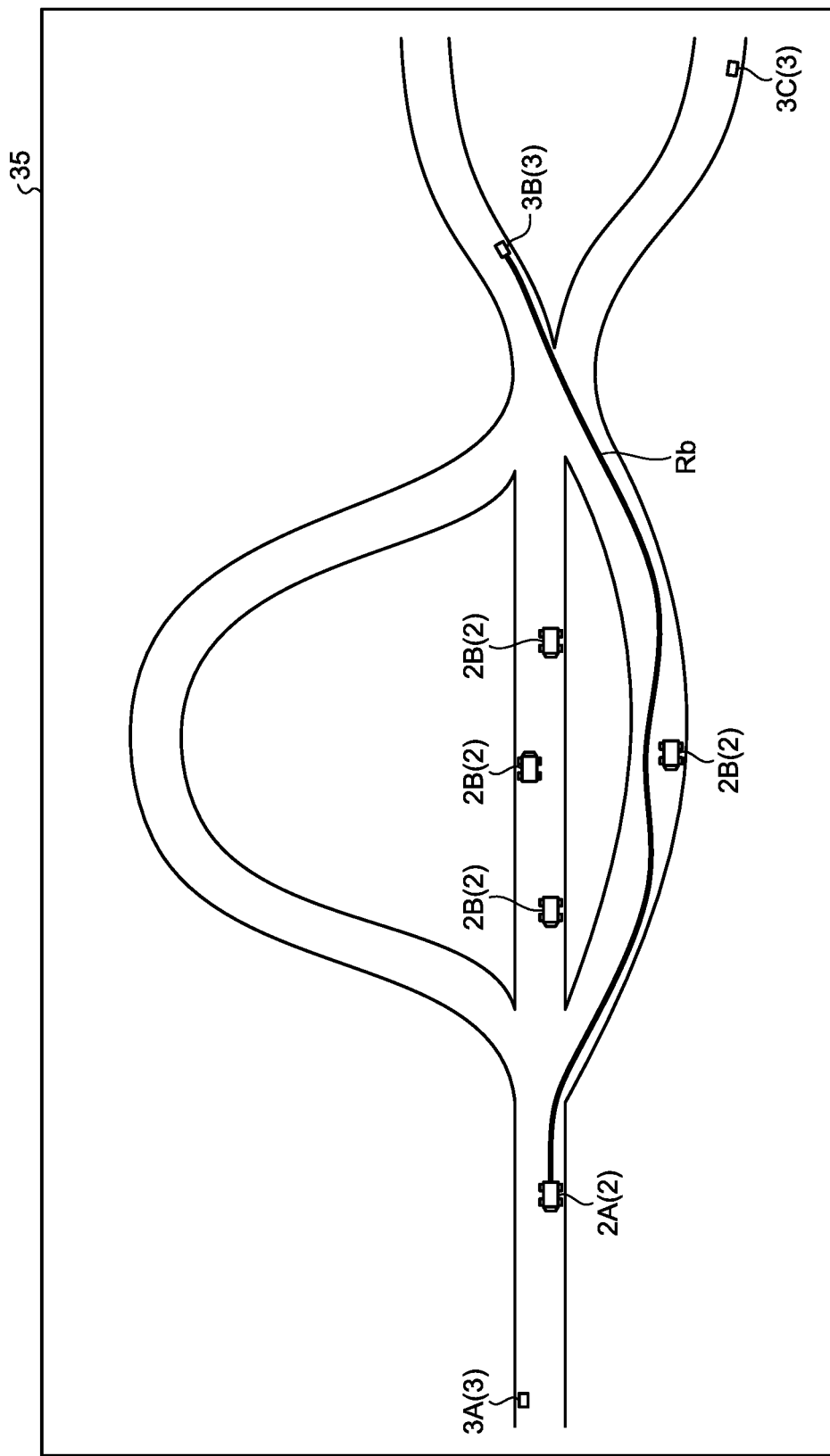
FIG. 12 is a view illustrating an example of the display device according to this embodiment.

FIG. 12 is a diagram illustrating an example of the display device 35 according to this embodiment. As illustrated in FIG. 12, the output control unit 304 causes the display device 35 to display the optimum route Rb from the manned vehicle 3B to the unmanned vehicle 2A. The output control unit 304 causes the display device 35 to display a thick line emphasizing the optimum route Rb as the optimum route data. The thick line is displayed so as to connect the manned vehicle 3B and the unmanned vehicle 2A. Accordingly, the driver Wa can intuitively recognize the optimum route Rb to the unmanned vehicle 2A through vision. The driver Wa can smoothly travel the manned vehicle 3B toward the unmanned vehicle 2A while viewing at the optimum route Rb displayed on the display device 35. Incidentally, the display data indicating the optimum route data may not be a thick line as long as the optimum route Rb can be highlighted.

The driver Wa of the manned vehicle 3B that has arrived at the unmanned vehicle 2A ascertains the situation of the unmanned vehicle 2A. In a case where the driver Wa ascertains the situation of the unmanned vehicle 2A and determines that the unmanned vehicle 2A can travel, the driver Wa operates the input device 34 to generate the situation data indicating that the unmanned vehicle 2A can travel. On the other hand, in a case where the driver Wa ascertains the situation of the unmanned vehicle 2A and determines that the unmanned vehicle 2A cannot travel, the driver Wa operates the input device 34 to generate the situation data indicating that the unmanned vehicle 2A cannot travel. The input data acquisition unit 303 acquires the situation data generated by the operation of the input device 34. The input data acquisition unit 303 transmits the situation data indicating the situation of the unmanned vehicle 2A to the management device 4 via the communication system 7 (Step S306). The processing of Step S306 corresponds to the processing of Step S6 described with reference to FIG. 2.

[Effect]

As described above, according to this embodiment, the position data of the unmanned vehicle 2A stopped due to the occurrence of the abnormality is output to the manned vehicle 3B. Accordingly, the manned vehicle 3B can travel toward the unmanned vehicle 2A on the basis of the position data of the unmanned vehicle 2A. The driver Wa of the manned vehicle 3B can quickly ascertain the situation of the unmanned vehicle 2A and take measures. Therefore, the decrease in productivity at the work site is suppressed.

The guidance unit 44 causes the display device 35 provided in the manned vehicle 3B to output the position data of the unmanned vehicle 2A. Accordingly, the driver Wa can drive the manned vehicle 3B toward the unmanned vehicle 2A while viewing the display device 35 and grasping the position of the unmanned vehicle 2A.

The restart command unit 47 outputs the restart command to restart the unmanned vehicle 2A on the basis of the situation data of the unmanned vehicle 2A. Accordingly, if the unmanned vehicle 2A can travel, the unmanned vehicle 2A can resume traveling on the basis of the target travel data. Therefore, the decrease in productivity at the work site is suppressed.

The guidance unit 44 outputs the optimum route from the manned vehicle 3B to the unmanned vehicle 2A on the basis of the position data of the unmanned vehicle 2A and the position data of the manned vehicle 3B. Accordingly, the manned vehicle 3B can quickly travel to the unmanned vehicle 2A according to the optimum route.

The optimum route is a travel route in which the time required for the manned vehicle 3B to reach the stopped unmanned vehicle 2A is the shortest among the plurality of travel routes connecting the manned vehicle 3B and the unmanned vehicle 2A. Accordingly, the manned vehicle 3B can reach the unmanned vehicle 2A in a short time.

The optimum route may be the shortest travel route among the plurality of travel routes connecting the manned vehicle 3B and the unmanned vehicle 2A. Accordingly, the travel distance of the manned vehicle 3B is shortened, and thus the manned vehicle 3B can reach the unmanned vehicle 2A in a short time.

The optimum route may be a travel route with the smallest number of other unmanned vehicles 2B among the plurality of travel routes connecting the manned vehicle 3B and the unmanned vehicle 2A. In the management system 1, in a case where the unmanned vehicle 2 is controlled to decelerate or stop when the relative distance between the unmanned vehicle 2 and the manned vehicle 3 becomes equal to or less than a threshold, when the manned vehicle 3B travels a travel route with a large number of unmanned vehicles 2B, many following unmanned vehicles 2B decelerate or stop. When the unmanned vehicle 2B decelerates to a traveling speed lower than the target traveling speed or stops, the productivity of the work site decreases. When the travel route with the smallest number of other unmanned vehicles 2B is selected as the optimum route among the plurality of travel routes connecting the manned vehicle 3B and the unmanned vehicle 2A, it is possible to suppress the decrease in productivity at the action site.

In a case where there are the plurality of unmanned vehicles 2 at the work site, when the optimum route is displayed, the driver of the manned vehicle 3 can recognize the presence of the unmanned vehicles 2 and drive the manned vehicle 3 safely to the unmanned vehicle 2 stopped due to the occurrence of the abnormality while not reducing the traveling speed of the unmanned vehicle 2 and avoiding a collision with the unmanned vehicle 2.

In a case where the plurality of manned vehicles 3 are present in the work site, the selection unit 45 selects a specific manned vehicle 3 from the plurality of manned vehicles 3, and the guidance unit 44 transmits the position data of the unmanned vehicle 2A stopped due to the occurrence of the abnormality to the specific manned vehicle 3 selected by the selection unit 45. Accordingly, the optimal manned vehicle 3 selected from the plurality of manned vehicles 3 is guided to the unmanned vehicle 2A.

The selection unit 45 selects the manned vehicle 3 with the shortest distance to the unmanned vehicle 2A among the plurality of manned vehicles 3 as the specific manned vehicle 3 traveling toward the unmanned vehicle 2A. Accordingly, the selected specific manned vehicle 3 can arrive at the unmanned vehicle 2A in a short time.

The selection unit 45 acquires the consent data or the refusal data for the request data from the manned vehicle 3 and determines the manned vehicle 3 to be traveled toward the unmanned vehicle 2A. Accordingly, it is suppressed that the operation of ascertaining the situation of the unmanned vehicle 2A is allocated to the driver Wa of the manned vehicle 3 which is hardly traveled or cannot be traveled toward the unmanned vehicle 2A.

[Computer System]

Figure 13:
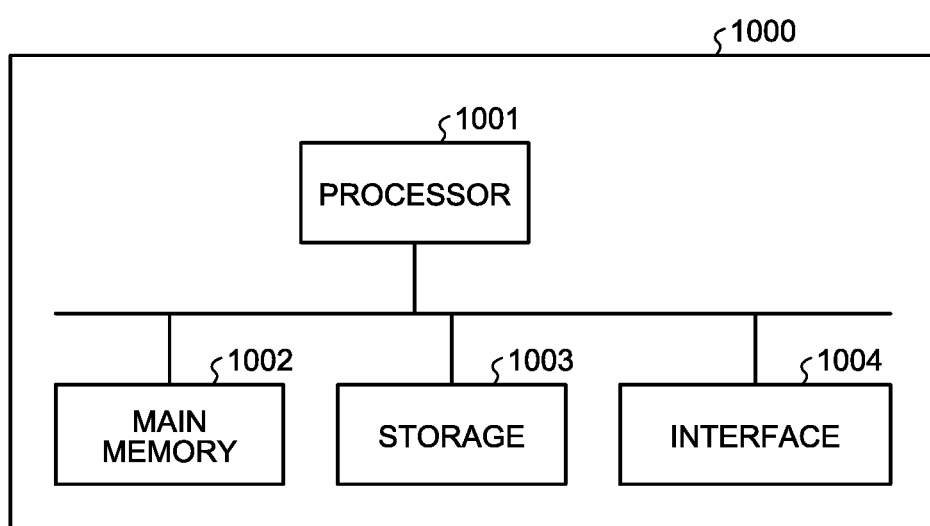
FIG. 13 is a block diagram illustrating an example of a computer system according to this embodiment.

FIG. 13 is a block diagram illustrating an example of a computer system 1000 according to this embodiment. Each of the management device 4, the control device 20, and the control device 30 described above includes the computer system 1000. The computer system 1000 includes a processor 1001 such as a central processing unit (CPU), a main memory 1002 including nonvolatile memory such as a read only memory (ROM) and volatile memory such as a random access memory (RAM), a storage 1003, and an interface 1004 including an input/output circuit. The function of the management device 4 described above, the function of the control device 20, and the function of the control device 30 are stored in the storage 1003 as programs. The processor 1001 reads a program from the storage 1003, develops the program in the main memory 1002, and executes the above-described processing according to the program. Incidentally, the program may be distributed to the computer system 1000 via a network.

Incidentally, in the embodiment described above, the control device 20 of the unmanned vehicle 2 may have at least a unit of the function of the management device 4, and the control device 30 of the manned vehicle 3 may have at least a unit of the function of the management device 4. That is, the control device 20 may function as the management device 4, or the control device 30 may function as the management device 4. For example, at least one of the control device 20 and the control device 30 includes the target travel data generation unit 41, the position data acquisition unit 42, the abnormal data acquisition unit 43, the guidance unit 44, the selection unit 45, the situation data acquisition unit 46, and the restart command unit 47. For example, the control device 30 may generate the optimum route from the manned vehicle 3 to the unmanned vehicle 2 on the basis of the position data of the unmanned vehicle 2 and the position data of the manned vehicle 3.

The computer system 1000 including at least one of the management device 4, the control device 20, and the control device 30 may acquire the position data of the unmanned vehicle 2 which has output abnormal data at the work site and may output the position data of the unmanned vehicle 2 that has output the abnormal data to the output device 35 provided in the manned vehicle 3 which can travel at the work site. Accordingly, the decrease in productivity can be suppressed at the work site where the unmanned vehicle 2 operates.

Other Embodiments

Incidentally, in the above embodiment, the unmanned vehicle 2 in which the abnormality occurs is stopped. The unmanned vehicle 2 in which the abnormality occurs may be decelerated. As described above, the abnormality in the traveling state of the unmanned vehicle 2 includes a state where the unmanned vehicle 2 is traveling at a traveling speed lower than the target traveling speed. The guidance unit 44 may cause the output device 35 provided in the manned vehicle 3 to output the position data of the decelerated unmanned vehicle 2.

Incidentally, in the above-described embodiment, the position data of the unmanned vehicle 2A and the optimum route data to the unmanned vehicle 2A are displayed on the display device 35 provided in the manned vehicle 3B. The position data of the unmanned vehicle 2A and the optimum route data to the unmanned vehicle 2A may not be displayed on the display device 35. In a case where the control device 30 can drive the manned vehicle 3B automatically, although the position data of the unmanned vehicle 2A and the optimum route data to the unmanned vehicle 2A are not displayed on the display device 35, the control device 30 can cause the manned vehicle 3B to travel toward the unmanned vehicle 2A on the basis of the position data of the unmanned vehicle 2A and the optimum route data to the unmanned vehicle 2A.

Incidentally, the output device 35 provided in the manned vehicle 3 may be a display device, an audio output device, or a printing device. The guidance unit 44 causes the output device 35 provided in the manned vehicle 3 to output the position data of the unmanned vehicle 2A that has output the abnormal data or to output the optimum route data to the unmanned vehicle 2A. For example, the guidance unit 44 may cause the audio output device to announce the position data of the unmanned vehicle 2A or the optimum route to the unmanned vehicle 2A by audio. In addition, the guidance unit 44 may cause the printing device to output the position data of the unmanned vehicle 2A or the optimum route to the unmanned vehicle 2A as a printed matter.

In the above-described embodiment, the selection unit 45 selects the manned vehicle 3 with the shortest distance to the unmanned vehicle 2A among the plurality of manned vehicles 3 as the specific manned vehicle 3 traveling toward the unmanned vehicle 2A. For example, the selection unit 45 may select the manned vehicle 3 with high rough road running performance as the specific manned vehicle 3 or may select the manned vehicle 3 driven by the driver Wa with high driving skill as the specific manned vehicle 3. In addition, the selection unit 45 may select the manned vehicle 3 with the shortest distance for traveling on a road with a bad road surface condition as the specific manned vehicle 3.

In the above embodiment, the driver Wa of the manned vehicle 3 rushing to the unmanned vehicle 2A ascertains the situation of the unmanned vehicle 2A and operates the input device 34 to generate situation data, the generated situation data is transmitted to the management device 4, and the restart command unit 47 of the management device 4 outputs the restart command of the unmanned vehicle 2A. The restart command may be generated by operating the input device 34 of the manned vehicle 3, and the generated restart command may be transmitted from the manned vehicle 3 to the unmanned vehicle 2 without passing through the management device 4. That is, the restart command generated by the manned vehicle 3 may be transmitted from the manned vehicle 3 to the unmanned vehicle 2 by inter-vehicle communication between the manned vehicle 3 and the unmanned vehicle 2.

Incidentally, in the above embodiment, the unmanned vehicle 2 is a dump truck which is a kind of transport vehicle. The unmanned vehicle 2 may be a working machine provided with working equipment such as an excavator or a bulldozer. The work machine provided with the working equipment may be remotely operated.

REFERENCE SIGNS LIST

1 MANAGEMENT SYSTEM
2 UNMANNED VEHICLE
3 MANNED VEHICLE
4 MANAGEMENT DEVICE
5 INPUT DEVICE
6 DISPLAY DEVICE (OUTPUT DEVICE)
7 COMMUNICATION SYSTEM
8 CONTROL FACILITY
9 WIRELESS COMMUNICATION DEVICE
20 CONTROL DEVICE
21 TRAVELING DEVICE
21B BRAKE DEVICE
21D DRIVE DEVICE
21H WHEEL
21S STEERING DEVICE
22 VEHICLE BODY
23 DUMP BODY
24 VEHICLE SPEED SENSOR
25 NON-CONTACT SENSOR
26 POSITION SENSOR
27 WIRELESS COMMUNICATION DEVICE
30 CONTROL DEVICE
31 TRAVELING DEVICE
31B BRAKE DEVICE
31D DRIVE DEVICE
31H WHEEL
31S STEERING DEVICE
32 VEHICLE BODY
33 POSITION SENSOR
34 INPUT DEVICE
35 DISPLAY DEVICE (OUTPUT DEVICE)
36 WIRELESS COMMUNICATION DEVICE
40 COMMUNICATION UNIT
41 TARGET TRAVEL DATA GENERATION UNIT
42 POSITION DATA ACQUISITION UNIT
43 ABNORMAL DATA ACQUISITION UNIT
44 GUIDANCE UNIT
45 SELECTION UNIT
46 SITUATION DATA ACQUISITION UNIT
47 RESTART COMMAND UNIT
48 INPUT DATA ACQUISITION UNIT
49 OUTPUT CONTROL UNIT
201 COMMUNICATION UNIT
202 TARGET TRAVEL DATA ACQUISITION UNIT
203 VEHICLE SPEED DATA ACQUISITION UNIT
204 OBSTACLE DATA ACQUISITION UNIT
205 POSITION DATA ACQUISITION UNIT
206 TRAVEL CONTROL UNIT
207 DETERMINATION UNIT
208 ABNORMAL DATA OUTPUT UNIT
301 COMMUNICATION UNIT
302 POSITION DATA ACQUISITION UNIT
303 INPUT DATA ACQUISITION UNIT
304 OUTPUT CONTROL UNIT
Wa DRIVER
Wb ADMINISTRATOR

The invention claimed is:

1. A management system of a work site comprising:
a guidance unit which outputs, to a manned vehicle of a work site, among a plurality of manned vehicles, guidance data for guiding the manned vehicle to an unmanned vehicle stopped due to occurrence of an abnormality at the work site, the guidance unit being included in a control device which includes a processor, a memory, a storage and an interface,
a position data acquisition unit which acquires position data of the manned vehicle, the position data acquisition unit being included in the control device which includes the processor, the memory, the storage and the interface, and
a selection unit which selects a specific manned vehicle from the plurality of manned vehicles on the basis of the position data of the unmanned vehicle and the respective position data of the plurality of manned vehicles, the selection unit being included in the control device which includes the processor, the memory, the storage and the interface,
wherein the guidance unit outputs the guidance data to an output device provided in the manned vehicle,
wherein the guidance data includes position data of the stopped unmanned vehicle,
wherein the guidance data includes optimum route data indicating an optimum route from the manned vehicle to the unmanned vehicle calculated on a basis of the position data of the unmanned vehicle and position data of the manned vehicle, and
wherein the guidance unit outputs the position data of the unmanned vehicle to the specific manned vehicle selected by the selection unit.

2. The management system of the work site according to claim 1, wherein
the optimum route is a travel route in which time required for the manned vehicle to reach the unmanned vehicle is the shortest among a plurality of travel routes connecting the manned vehicle and the unmanned vehicle.

3. The management system of the work site according to claim 1, wherein
the specific manned vehicle is a manned vehicle with the shortest distance to the unmanned vehicle among the plurality of manned vehicles.

4. The management system of the work site according to claim 1, wherein
the guidance unit outputs request data to the manned vehicle, and
the selection unit acquires, from the manned vehicle, consent data or refusal data with respect to the request data.

5. The management system of the work site according to claim 1, further comprising:
a restart command unit which outputs a restart command to restart the unmanned vehicle on a basis of situation data of the unmanned vehicle, the restart command unit being included in the control device which includes the processor, the memory, the storage and the interface.

6. A management method of a work site comprising:
outputting, to a manned vehicle of a work site, among a plurality of manned vehicles, guidance data for guiding the manned vehicle to an unmanned vehicle stopped due to occurrence of an abnormality at the work site
acquiring position data of the manned vehicle, and
selecting a specific manned vehicle from the plurality of manned vehicles on the basis of the position data of the unmanned vehicle and the respective position data of the plurality of manned vehicles,
wherein the guidance data is output to an output device provided in the manned vehicle,
wherein the guidance data includes position data of the stopped unmanned vehicle, wherein the guidance data includes optimum route data indicating an optimum route from the manned vehicle to the unmanned vehicle calculated on a basis of the position data of the unmanned vehicle and position data of the manned vehicle, and
wherein the position data of the unmanned vehicle is output to the specific manned vehicle selected.

* * * * *